(12) United States Patent
Zhang et al.

(10) Patent No.: US 12,300,896 B2
(45) Date of Patent: May 13, 2025

(54) CIRCULAR ARRAY ANTENNA WITH ANGULAR OFFSET

(71) Applicant: QUALCOMM Incorporated, San Diego, CA (US)

(72) Inventors: Danlu Zhang, San Diego, CA (US); Meilong Jiang, Westfield, NJ (US); Juergen Cezanne, Ocean Township, NJ (US); Junyi Li, Fairless Hills, PA (US); Ashwin Sampath, Skillman, NJ (US); Yu Zhang, San Diego, CA (US); Allen Minh-Triet Tran, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/830,101

(22) Filed: Jun. 1, 2022

(65) Prior Publication Data

US 2023/0395994 A1 Dec. 7, 2023

(51) Int. Cl.
*H01Q 21/20* (2006.01)
*H01Q 3/34* (2006.01)
*H04B 7/06* (2006.01)

(52) U.S. Cl.
CPC ............ *H01Q 21/205* (2013.01); *H01Q 3/34* (2013.01); *H04B 7/0608* (2013.01); *H04B 7/0691* (2013.01)

(58) Field of Classification Search
USPC ........................................................ 343/702
See application file for complete search history.

(56) References Cited

U.S. PATENT DOCUMENTS

| | | | | |
|---|---|---|---|---|
| 4,980,692 A | * | 12/1990 | Rudish | H01Q 3/40 343/778 |
| 9,395,727 B1 | * | 7/2016 | Smith | G01S 7/03 |
| 11,153,002 B2 | * | 10/2021 | Alavi | H04B 7/0697 |
| 11,552,405 B1 | * | 1/2023 | Bily | H01Q 21/061 |
| 11,799,213 B2 | * | 10/2023 | Moon | H04B 7/0691 |
| 2010/0066590 A1 | * | 3/2010 | Brown | H01Q 3/2605 342/147 |
| 2018/0166761 A1 | * | 6/2018 | Henry | H04B 17/3911 |

FOREIGN PATENT DOCUMENTS

| | | | | |
|---|---|---|---|---|
| CN | 111710992 B | * | 8/2021 | ............ H01Q 1/285 |
| CN | 113346237 A | * | 9/2021 | ............ H01Q 1/246 |
| CN | 114142234 A | * | 3/2022 | |

* cited by examiner

*Primary Examiner* — Hoang V Nguyen
*Assistant Examiner* — Brandon Sean Woods
(74) *Attorney, Agent, or Firm* — Loza & Loza LLP

(57) ABSTRACT

Aspects relate to an array antenna and communication using the array antenna. In some examples, the array antenna includes a first array of antenna elements arranged according to a first circle and a second array of antenna elements arranged according to a second circle, where the first circle and the second circle are concentric circles. In some examples, the first array of antenna elements is arranged with an angular offset with respect to the second array of antenna elements. For example, a first radius associated with a first antenna element of the first array of antenna elements may be offset at an angle with respect to a second radius of a second antenna element of the second array of antenna elements.

29 Claims, 19 Drawing Sheets

CIRCULAR ARRAY ANTENNA WITH ANGULAR OFFSET

TECHNICAL FIELD

The technology discussed below relates generally to wireless communication and, more particularly, to a circular array antenna where different antenna circles within the circular array antenna have different angular offsets.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

In wireless communication systems, such as those specified under standards for 5G New Radio (NR), wireless communication devices may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, an array antenna is disclosed. The antenna array may include a first array of antenna elements and a second array of antenna elements. The first array of antenna elements may be arranged at substantially equal first distances along a first circle defining a center point. The first array of antenna elements may include a first antenna element defining a first radius from the center point. The second array of antenna elements may be arranged at substantially equal second distances along a second circle that is substantially concentric with the first circle relative to the center point. The second array of antenna elements may include a second antenna element defining a second radius from the center point. The second radius may be offset at a first angle with respect to the first radius.

In some examples, an antenna system is disclosed. The antenna system may include a first antenna and a second antenna. The first antenna may include a first array of antenna elements and a second array of antenna elements. The first array of antenna elements may be arranged at substantially equal first distances along a first circle defining a first center point. The first array of antenna elements may include a first antenna element defining a first radius from the first center point. The second array of antenna elements may be arranged at substantially equal second distances along a second circle that is substantially concentric with the first circle relative to the first center point. The second array of antenna elements may include a second antenna element defining a second radius from the first center point. The second radius may be offset at a first angle with respect to the first radius. The second antenna may include a third array of antenna elements and a fourth array of antenna elements. The third array of antenna elements may be arranged at substantially equal third distances along a third circle defining a second center point. The third array of antenna elements may include a third antenna element defining a third radius from the second center point. The fourth array of antenna elements may be arranged at substantially equal fourth distances along a fourth circle that is substantially concentric with the third circle relative to the second center point. The fourth array of antenna elements may include a fourth antenna element defining a fourth radius from the second center point. The fourth radius may be offset at a second angle with respect to the third radius. The third radius may be offset at a third angle with respect to the first radius.

In some examples, a wireless communication device is disclosed. The wireless communication device may include an antenna array, a transceiver coupled to the antenna array, a memory, and a processor coupled to the transceiver and the memory. The antenna array may include a first array of antenna elements arranged according to a first circle defining a center point. The antenna array may also include a second array of antenna elements arranged according to a second circle substantially concentric with the first circle relative to the center point. The processor and the memory may be configured to transmit, via the transceiver and the first array of antenna elements, first orbital angular momentum signals based on a first reference angle. The processor and the memory may also be configured to transmit, via the transceiver and the second array of antenna elements, second orbital angular momentum signals based on a first offset to the first reference angle.

In some examples, method for wireless communication at a wireless communication device is disclosed. The method may include transmitting, via a first array of antenna elements arranged according to a first circle defining a center point, first orbital angular momentum signals based on a first reference angle. The method may also include transmitting, via a second array of antenna elements arranged according to a second circle substantially concentric with the first circle relative to the center point, second orbital angular momentum signals based on a first offset to the first reference angle.

In some examples, a wireless communication device is disclosed. The wireless communication device may include an antenna array, a transceiver coupled to the antenna array, a memory, and a processor coupled to the transceiver and the memory. The antenna array may include a first array of antenna elements arranged according to a first circle defining a center point. The antenna array may also include a second array of antenna elements arranged according to a second circle substantially concentric with the first circle relative to the center point. The processor and the memory may be configured to receive, via the transceiver and the first array of antenna elements, first orbital angular momentum signals based on a first reference angle. The processor and the memory may also be configured to receive, via the transceiver and the second array of antenna elements, second orbital angular momentum signals based on a first offset to the first reference angle.

In some examples, method for wireless communication at a wireless communication device is disclosed. The method may include receiving, via a first array of antenna elements arranged according to a first circle defining a center point, first orbital angular momentum signals based on a first reference angle. The method may also include receiving, via a second array of antenna elements arranged according to a second circle substantially concentric with the first circle relative to the center point, second orbital angular momentum signals based on a first offset to the first reference angle.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
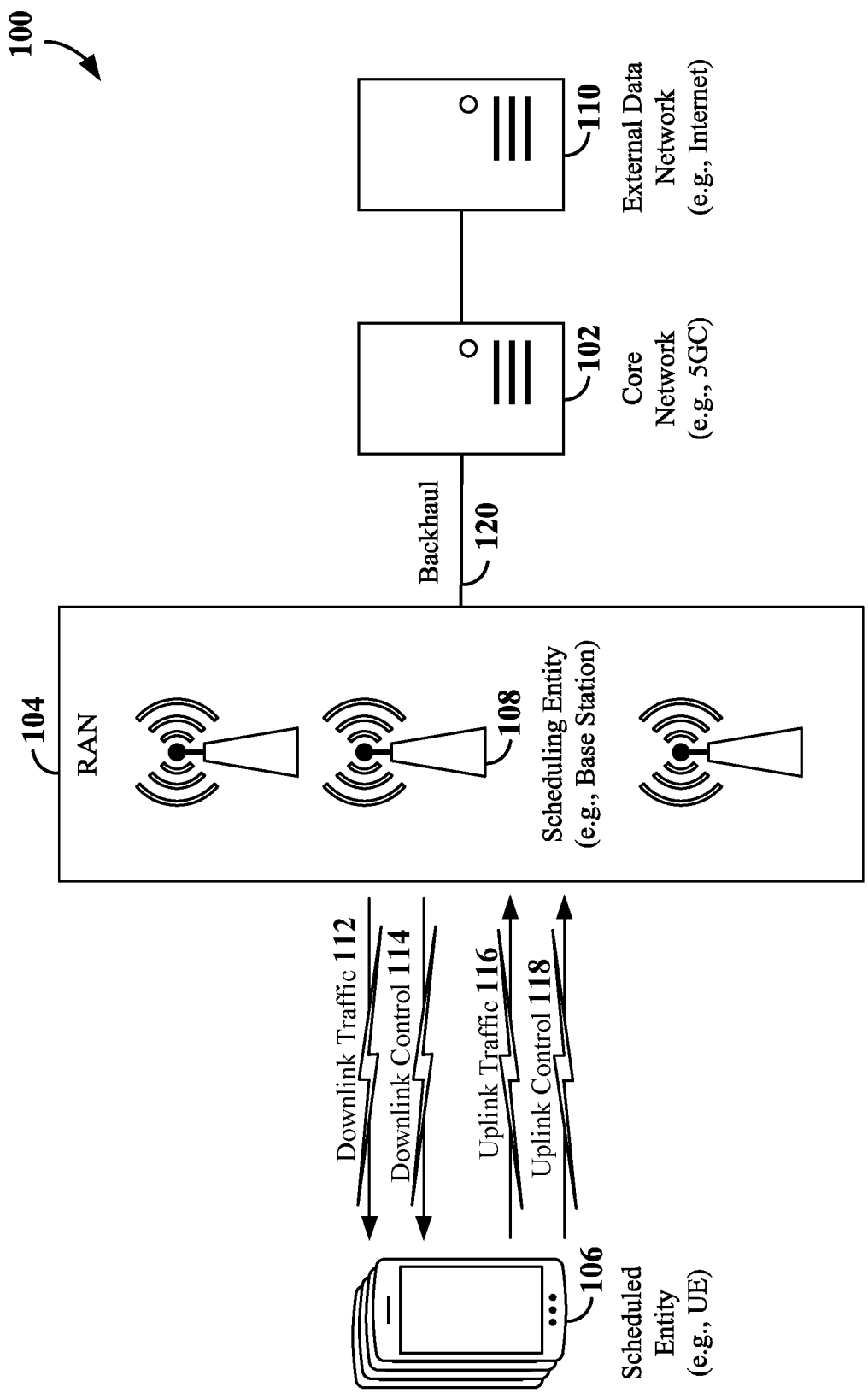
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to a circular array antenna. The circular array antenna may include a first array of antenna elements arranged along a first circle and a second array of antenna elements arranged along a second circle, where the first circle and the second circle are concentric circles. In some examples, the first array of antenna elements is further arranged with an angular offset with respect to the second array of antenna elements. For example, a first radius of a first antenna element of the first array of antenna elements from a center of the concentric circles may have an angular offset with respect to a second radius of a second antenna element of the second array of antenna elements from the center of the concentric circles.

In some examples, the use of an angular offset between antenna elements of different circles of an array antenna may reduce inter-antenna coupling as compared to an antenna array that does not use such an angular offset. For example, the inter-antenna coupling may be lower for an antenna array that uses such an angular offset since more separation may be provided between individual antenna elements.

In some examples, the use of an angular offset between antenna elements of different circles of an array antenna may enable the size of the antenna array to be reduced relative to the size of an antenna array that does not use such an angular offset. For example, the concentric circles may be configured closer together for an antenna array that uses such an angular offset without significantly affecting inter-antenna coupling since sufficient separation (e.g., greater than $\lambda/2$) may still be maintained between individual antenna elements.

Various aspects of the disclosure relate to orbital angular momentum (OAM) multiplexing using a multi-circle array antenna with an angular offset between antenna elements of different circles of the array antenna. In some examples, different signal weights are applied to different antenna elements of the antenna array to generate different OAM modes for the OAM multiplexing. In some examples, a signal weight for a given antenna element may be based on an angle (e.g., relative to a defined reference radius or defined reference radii) associated with that antenna element.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
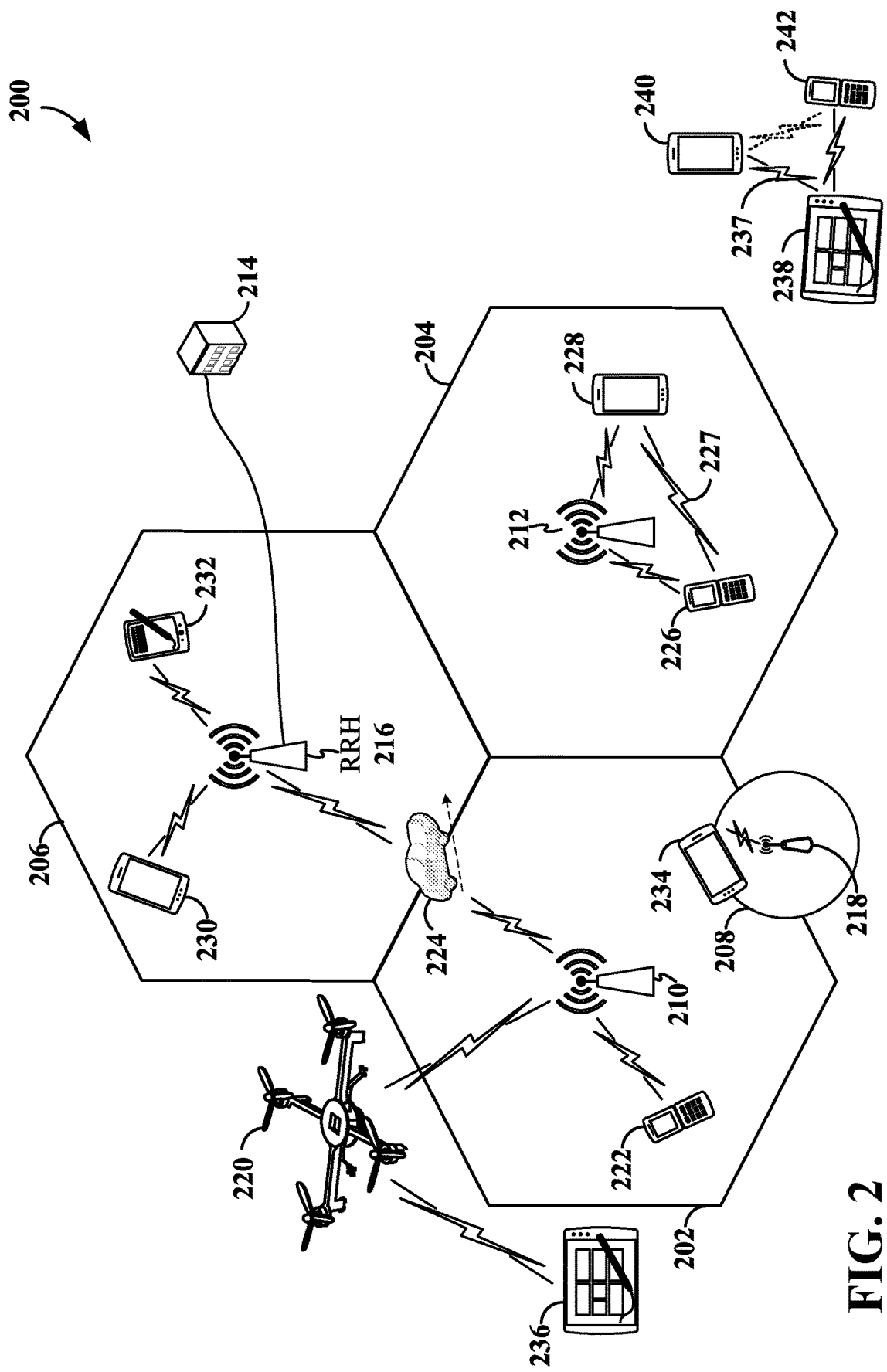
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
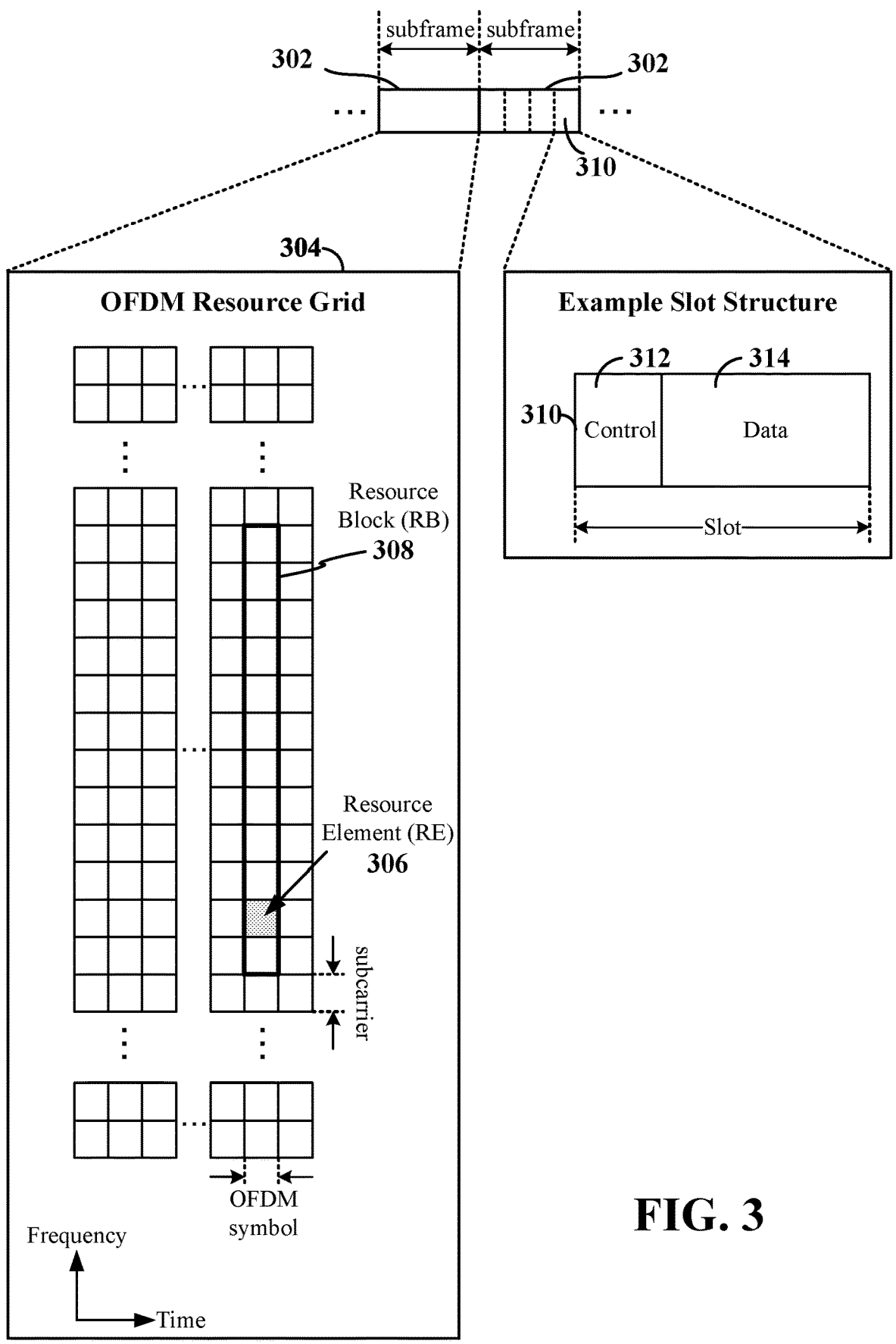
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
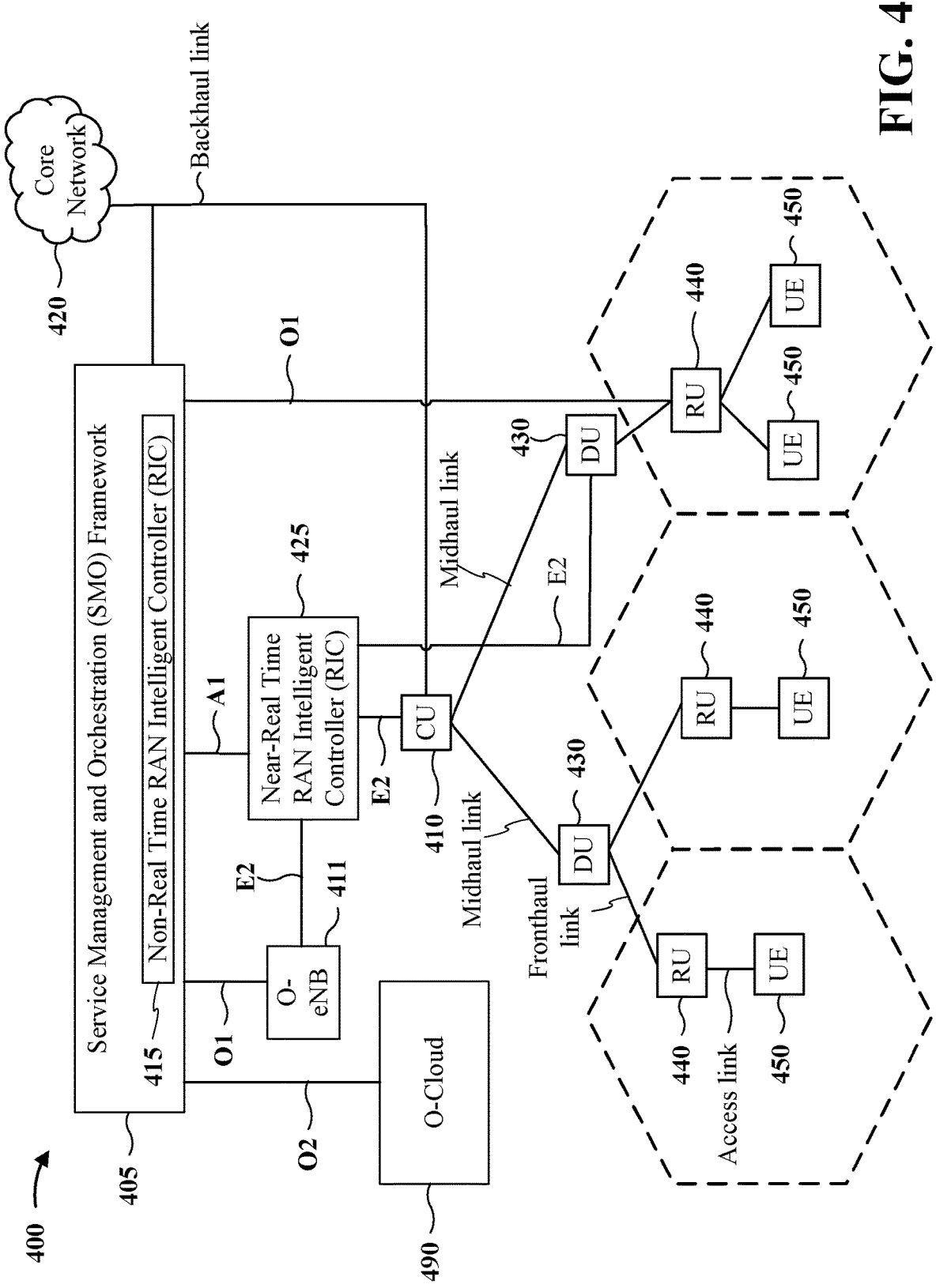
FIG. 4 is a diagram providing a high-level illustration of one example of a configuration of a disaggregated base station according to some aspects.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 450 via one or more radio frequency (RF) access links. In some implementations, the UE 450 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the distributed unit (DU) 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 450. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
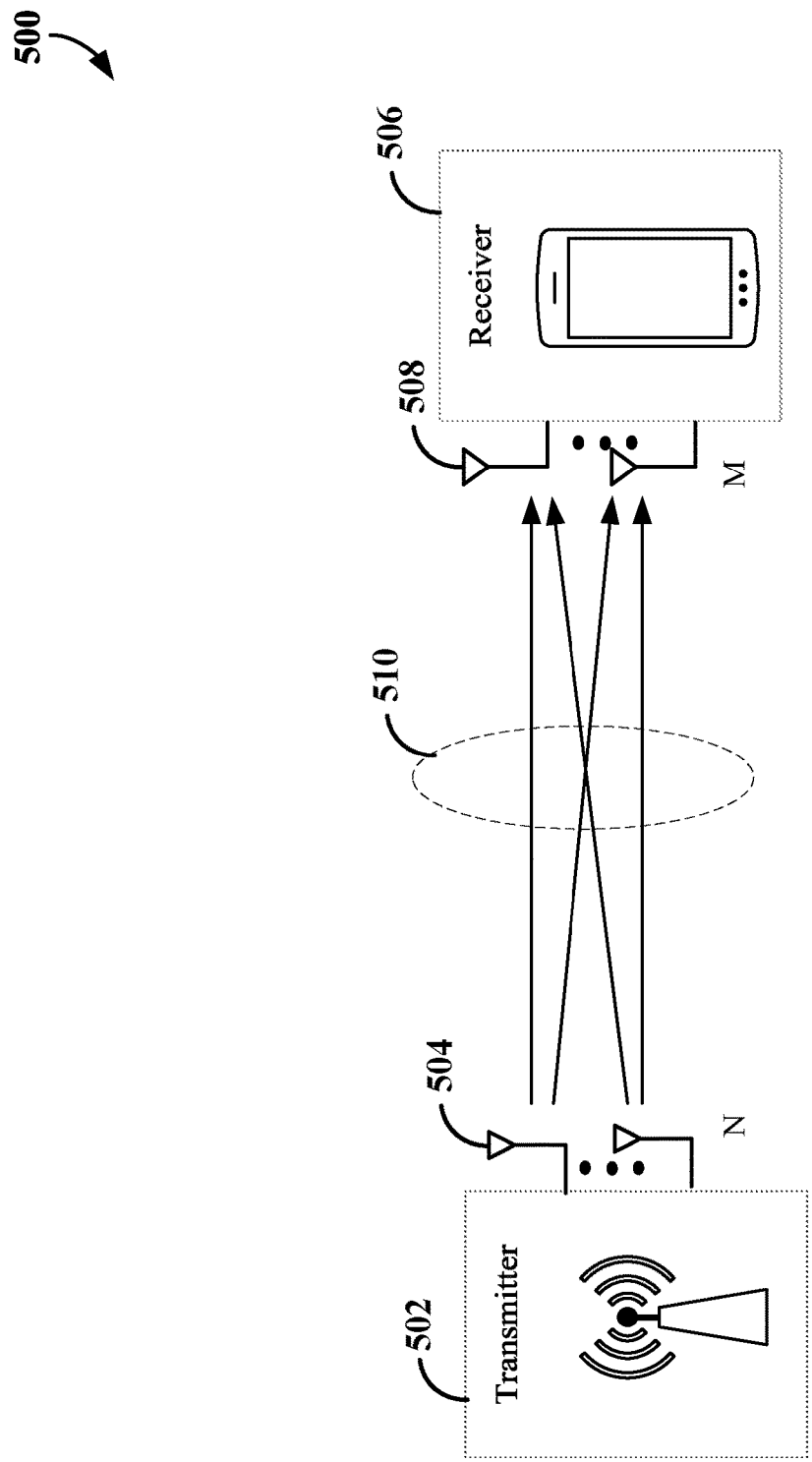
FIG. 5 is a schematic illustration of an example of a wireless communication system supporting beamforming and/or multiple-input multiple-output (MIMO) communication according to some aspects.

A wireless communication device may be configured for beamforming and/or multiple-input multiple-output (MIMO) technology. FIG. 5 illustrates an example of a wireless communication system 500 supporting beamforming and/or MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system (e.g., MIMO system) is limited by the number of transmit antennas or receive antennas, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or the receiver 506 to shape or steer an antenna beam (e.g., a transmit beam or a receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

In some examples, beamforming may be used for wireless communication between distributed wireless communication devices (e.g., as described above in conjunction with FIG. 4). For example, beamforming may be used for in-band or out-of-band deployments of a wireless fronthaul link between a distributed unit and a radio unit where there is line-of-sight (LOS) between the transmit (Tx) and receive (Rx) antenna panels. In some examples, a DU is deployed with a single aperture array that communicates with a single RU, multiple wireless RUs, or other nodes such as integrated access backhaul (IAB) nodes or repeater nodes. As another example, beamforming may be used for wireless communication over a backhaul link or a midhaul link for a CU or some other type of network entity. For example, beamforming may be used for a backhaul that has LOS between the Tx antenna panel and the Rx antenna panel. Also, in some examples, beamforming may be used for an access link that has LOS between the Tx antenna panel and the Rx antenna panel. In some examples, where beamforming is used for MIMO wireless communication, the wireless communication may be referred to as LOS MIMO.

In some examples, LOS MIMO technology may be used to meet high data rate and/or throughput requirements. For example, when relatively large antenna arrays are used (e.g., up to one meter in size) and higher frequency bands are available for the wireless communication, LOS MIMO can achieve very high spectrum efficiency. Thus, a very high data rate may be achieved for a wide range of Tx-Rx distances and Tx-Rx shifts away from the boresight. Also, at higher carrier frequencies (e.g., FR4, FR5, and higher frequency bands), smaller LOS MIMO antenna arrays may be used. Accordingly, LOS MIMO antenna arrays may be used on smaller wireless communication devices (e.g., UEs, etc.) in some examples.

Orbital Angular Momentum (OAM) communication is a type of LOS MIMO communication that may use a uniform circular array antenna. For example, an OAM communication transmitter (hereafter referred to as an OAM transmitter) may radiate, through an array of apertures, multiple coaxially propagating, spatially-overlapping waves each carrying a data stream. Here, the OAM of the electromagnetic wave may be associated with a field spatial distribution, which may be in the form of a helical or twisted wavefront shape. In some aspects, an OAM wave may be generated through the use of a rotating phase term. For example, the phase terms for different beams may be rotated at different speeds, thereby providing orthogonality between the different beams. These different phase rotations may be referred to as different OAM modes. An electromagnetic (EM) wave with a helical transverse phase of the form $\exp(i\varphi l)$ carries an OAM mode waveform, where $\varphi$ is the azimuthal angle and l is an unbounded integer (which may be referred to as the OAM order). Thus, an OAM transmitter may radiate multiple coaxially propagating, spatially-overlapping waves for various OAM modes (e.g., OAM mode l= . . . , −2, −1, 0, 1, 2, . . . ).

OAM waves may be orthogonally received on the same radio resources (time-frequency domains). In addition, polarization can be added to each OAM mode to double the number of orthogonal streams. For example, two linear polarizations (e.g., horizontal and vertical) or two circular polarizations (e.g., clockwise and counter-clockwise), or two elliptical polarizations can be added to each OAM mode. Consequently, the use of OAM multiplexing can improve communication spectrum efficiency. Moreover, this improved efficiency may be achieved with relatively low receive processing complexity.

OAM modes may be characterized by a wavefront that is shaped as a helix with an optical vortex in the center (e.g., at the beam axis), where each OAM mode is associated with a different helical wavefront structure. The OAM modes may be defined or referred to by the mode index l, where a sign of the mode index l may indicate a right-handed helix (or right-handed helices) or a left-handed helix (or left-handed helices). In addition, a magnitude of the mode index l (e.g., |l|) may correspond to a quantity of distinct but interleaved helices of the electromagnetic wave.

For example, for an electromagnetic wave associated with an OAM mode index of l=0, the electromagnetic wave may not be helical and the wavefronts of the electromagnetic wave may be multiple disconnected surfaces (e.g., the electromagnetic wave is a sequence of parallel planes). Traditional EM beams (such as Gaussian beams) are OAM beams with l=0.

For an electromagnetic wave associated with an OAM mode index of l=+1, the electromagnetic wave may propagate in a right-handed pattern (e.g., the wave has a right circular polarization or may be understood as having a clockwise circular polarization) and the wavefront of the electromagnetic wave may be shaped as a single helical surface with a step length equal to a wavelength λ of the electromagnetic wave. Similarly, for an OAM mode index of l=−1, the electromagnetic wave may propagate in a left-handed pattern (e.g., the wave has a left circular polarization or may be understood as having a counter-clockwise circular polarization) and the wavefront of the electromagnetic wave may also be shaped as a single helical surface with a step length equal to the wavelength λ of the electromagnetic wave.

For an OAM mode index of l=±2, the electromagnetic wave may propagate in either a right-handed pattern (if +2) or in a left-handed pattern (if −2) and the wavefront of the electromagnetic wave may include two distinct but interleaved helical surfaces. In such examples, the step length of each helical surface may be equal to λ/2. Likewise, the phase delay over one revolution of the electromagnetic wave may be equal to ±4π. In general terms, a mode-l electromagnetic wave may propagate in either a right-handed pattern or a left-handed pattern (depending on the sign of l) and may include l distinct but interleaved helical surfaces with a step length of each helical surface equal to λ/|l|. In some examples, an electromagnetic wave may be indefinitely extended to provide for an infinite number of degrees of freedom of the OAM of the electromagnetic wave (e.g., l=0, ±1, ±2, . . . , ±∞).

In some examples, the OAM mode index l of an electromagnetic wave may correspond to or otherwise function as (e.g., be defined as) an additional dimension for signal or channel multiplexing. For example, each OAM mode, which may correspond to an OAM state, may function similarly to (e.g., or equivalently as) a communication channel, such as a sub-channel. In other words, a given OAM mode or state may correspond to a particular communication channel, and vice versa.

Communication based on OAM multiplexing, due to its capability to provide high-order spatial multiplexing, may be used to provide higher data rates for 3GPP 5G enhancements, 5G phase 2, or other wireless communication standards. For example, OAM multiplexing may be used in 3GPP 6G communication or other future wireless communication standards.

Figure 6:
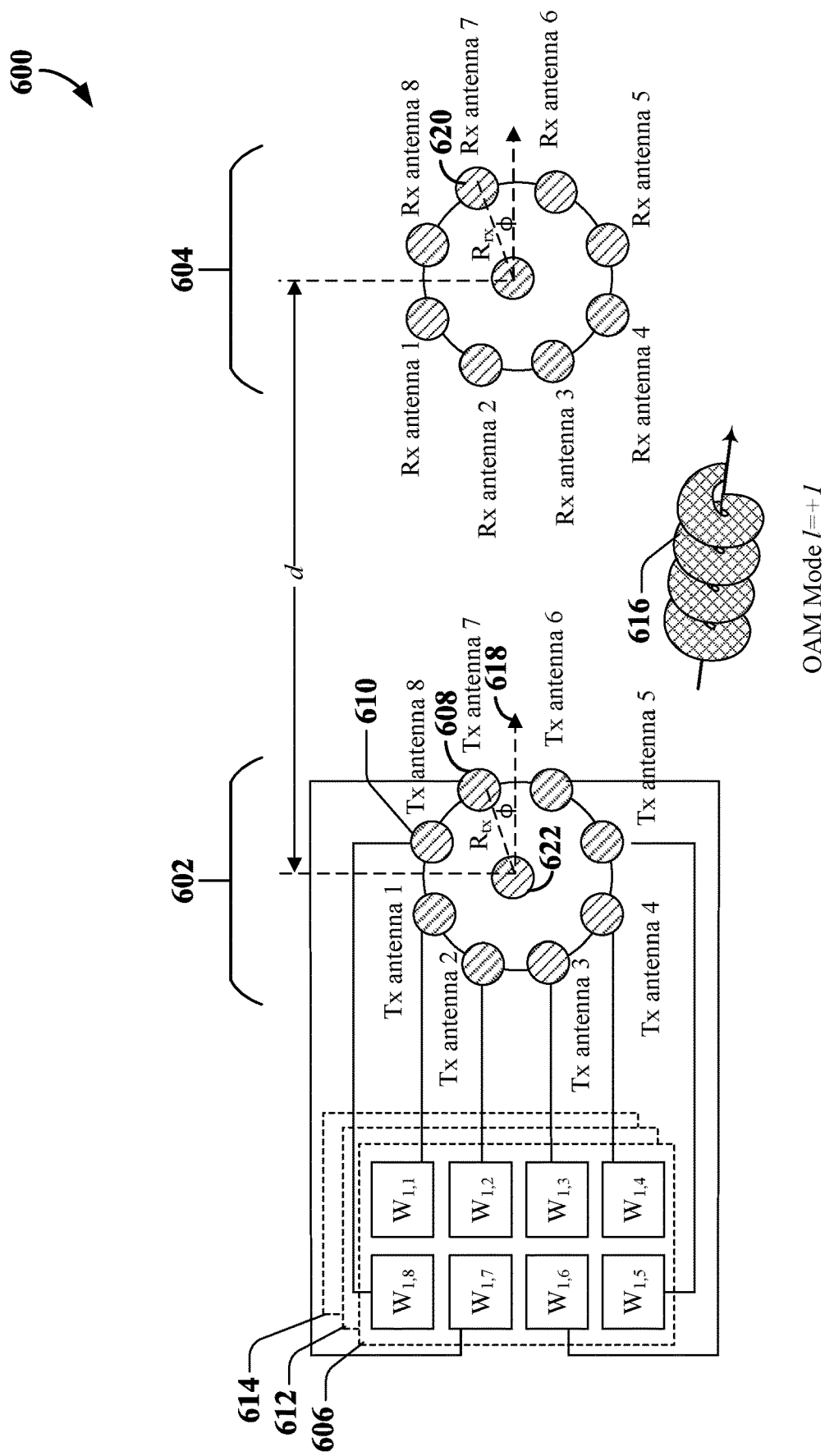
FIG. 6 is a schematic illustration of an example of transmit and receive antennas for orbital angular momentum (OAM) multiplexing according to some aspects.

FIG. 6 is a schematic illustration of an example 600 of transmit and receive antennas for OAM multiplexing according to some aspects. In some examples, an OAM-based communication system may include a set of uniform circular array (UCA) transmitter antennas and a set of UCA receiver antennas. In the example of FIG. 6, a first set of UCA antennas 602 is employed at an OAM transmitter and a second set of UCA antennas 604 is employed at an OAM receiver. The first set of UCA antennas 602 includes eight antenna elements in this example (Tx antenna 1, Tx antenna 2, Tx antenna 3, Tx antenna 4, Tx antenna 5, Tx antenna 6, Tx antenna 7, and Tx antenna 8). The second set of UCA antennas 604 also includes eight antenna elements in this example (Rx antenna 1, Rx antenna 2, Rx antenna 3, Rx antenna 4, Rx antenna 5, Rx antenna 6, Rx antenna 7, and Rx antenna 8). The first set of UCA antennas 602 and the second set of UCA antennas 604 are separated by a distance d. In each of the first set of UCA antennas 602 and the second set of UCA antenna 604, the individual antenna elements are evenly distributed in a circle.

If the same signal with the same phase was transmitted on each antenna of the first set of UCA antennas 602, a plane wave would be generated (e.g., OAM mode 0). However, for mode 1 OAM, signals with the same amplitude but with different phase terms may be transmitted on each antenna of the first set of UCA antennas 602. For example, the phase may differ by 45 degrees from one antenna (e.g., Tx antenna 1) to the next antenna (e.g., Tx antenna 2). The phase may be changed faster (e.g., using larger phase differences) in some examples, or the phase may be changed slower (e.g., using smaller phase differences) in other examples. The OAM receiver may then apply the conjugate of these phase terms to recover the received signal. Other combinations of signal amplitude and/or phase terms may be used to generate other OAM modes.

In the example of FIG. 6, the UCA transmitter generates eight signals, one for each of the antenna elements in the first set of UCA antennas 602. As further illustrated in FIG. 6, a respective weight may be applied to each of these signals.

Here, the UCA transmitter may multiply respective OAM-formed weights $w_1=[w_{1,1}, w_{1,2}, \ldots, w_{1,8}]^T$ 606 onto each antenna, to generate a signal port. For example, a weight $w_{1,7}$ may be applied for Tx antenna 7 608, a weight $w_{1,8}$ may be applied for Tx antenna 8 610, and so on. Different weights (e.g., $w_2=[w_{2,1}, w_{2,2}, \ldots, w_{2,8}]^T$ 612 or $w_3=[w_{3,1}, w_{3,2}, \ldots, w_{3,8}]^T$ 614) may be applied in different examples. In some examples, the UCA transmitter may use the weights $w_1$ 606 for a first OAM mode index (e.g., l=0), use the weights $w_2$ 612 for a second OAM mode index (e.g., l=+1) and use the weights $w_3$ 614 for a third OAM mode index (e.g., l=−1). As discussed above, each OAM mode may be characterized by a different helical wave structure (e.g., the wave structure 616 for OAM mode l=+1).

In some examples, the weight of each antenna may be defined equal to exp(iφl), where φ is the angle of the antenna in the circle, and l is the OAM mode index. In this case, the OAM-formed port may correspond to an equivalent OAM model. By using different OAM-formed weights exp(iφl'), where l'≠l, multiple OAM modes can be generated. FIG. 6 illustrates an example of the angle φ for the radius ($R_{tx}$) of the Tx antenna 7 616 relative to a reference angle 618. The second set of UCA antennas 604 are configured with corresponding angles (e.g., the angle for the radius ($R_{rx}$) of the Rx antenna 7 620 is φ). The center antenna (e.g., antenna 622) of each circle can be used alone to generate or receive OAM mode 0.

A UCA communication receiver (hereafter referred to as a UCA receiver) may sample a received waveform at each of the antenna elements of the second set of UCA antennas 604. Here, the UCA receiver may make into account the OAM mode used by the UCA transmitter and any offsets of the antennas when decoding the received waveform.

In some examples, the channel matrix from each transmit antenna to each receive antenna (e.g., from Tx antenna 1 to Rx antenna 1) may be denoted as H. In addition, for the OAM-formed channel matrix $\tilde{H}=H \cdot [w_1, w_2, \ldots, w_L]$, any two columns of $\tilde{H}$ are orthogonal. In this case, the OAM channels have no crosstalk with respect to one another. Consequently, OAM-based communication can realize a high-level of spatial multiplexing degree in an efficient manner.

Figure 7:
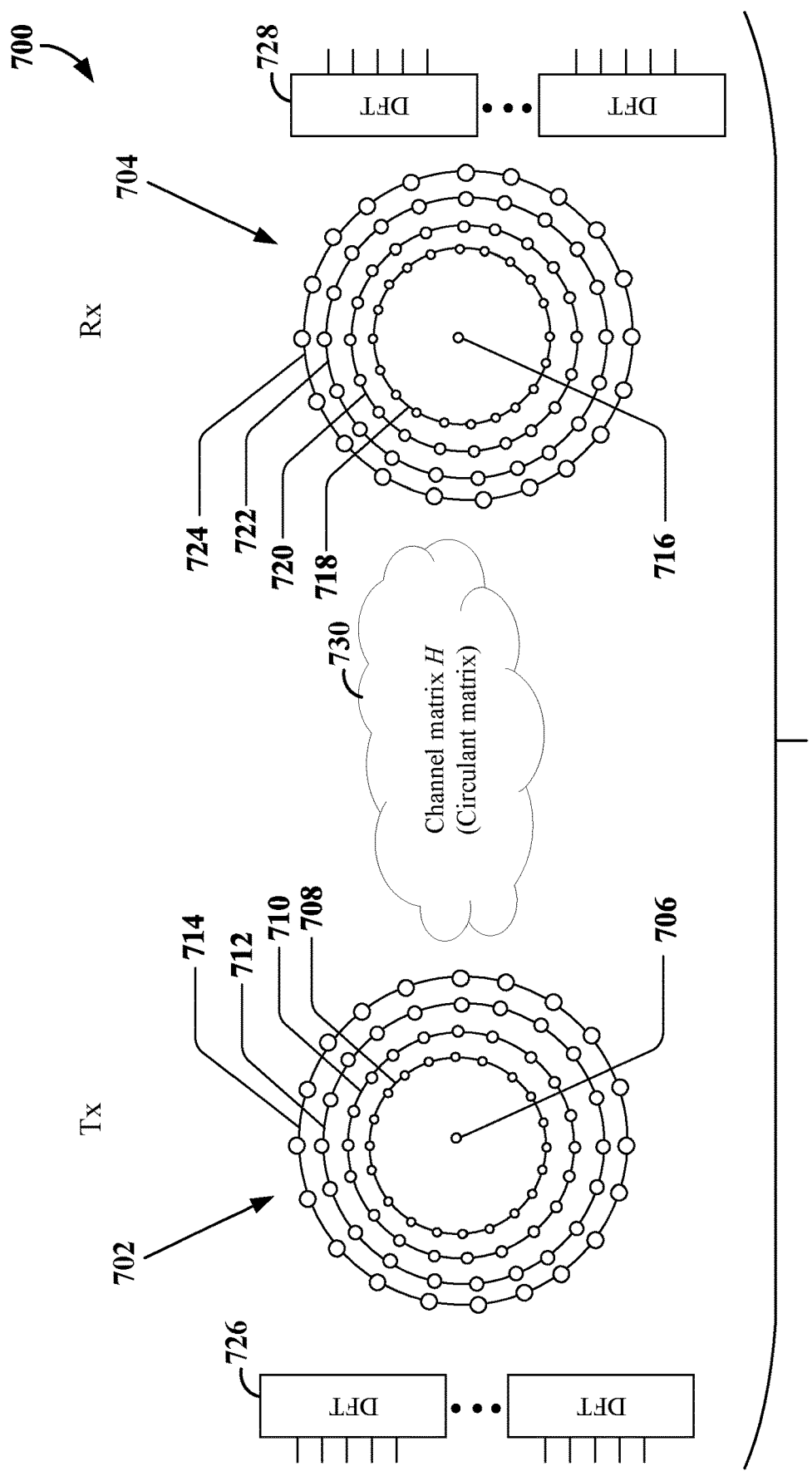
FIG. 7 is a schematic illustration of an example of transmit and receive antennas for multi-circle OAM multiplexing according to some aspects.

FIG. 7 is a schematic illustration of an example 700 of transmit and receive antennas for multi-circle OAM multiplexing according to some aspects. In this case, multiple co-axial UCA antenna circles (a first set of UCA antennas 702 and a second set of UCA antennas 704) are deployed at the OAM transmitter and the OAM receiver. The first set of UCA antennas 702 for the OAM transmitter includes a central antenna 706, a first UCA antenna 708, a second UCA antenna 710, a third UCA antenna 712, and a fourth UCA antenna 714. The second set of UCA antennas 704 for the OAM receiver includes a central antenna 716, a first UCA antenna 718, a second UCA antenna 720, a third UCA antenna 722, and a fourth UCA antenna 724. As shown, the UCA antenna circles including the first set of UCA antennas 702 and the second set of UCA antennas 704 are concentric circles.

A first set of discrete Fourier transform (DFT) circuits 726 (e.g., one DFT circuit for each UCA antenna) at the OAM transmitter generates the OAM modes for the first set of UCA antennas 702. A second set of discrete Fourier transform (DFT) circuits 728 (e.g., one DFT circuit for each UCA antenna) at the OAM receiver performs OAM mode separation on the signals that pass through a channel 730 (represented by the circulant channel matrix H) and are received via the second set of UCA antennas 704. The equivalent channel matrix A over the transmit receive chain thus includes the effects of the first set of DFT circuits 726, the first set of UCA antennas 702, the channel matrix H, the second set of UCA antennas 704, and the second set of DFT circuits 728.

In some examples (e.g., that use a limited number of RF power amplifiers), a single power amplifier may be used to transmit (or receive) via a given UCA antenna circle. Thus, signals having the same amplitude may be transmitted on each antenna of a given UCA antenna. In this case, the different UCA modes may be defined between the UCA antenna circles (e.g., 4 OAM modes in the example of FIG. 7). For example, the phase may differ by a specified number of degrees from one UCA antenna circle to another UCA antenna circle (e.g., with respect to antennas along the same radial line such as the Tx antenna 1 of each UCA antenna). Also, in some examples, different UCA antenna circles may incorporate a different number of antennas.

Figure 8:
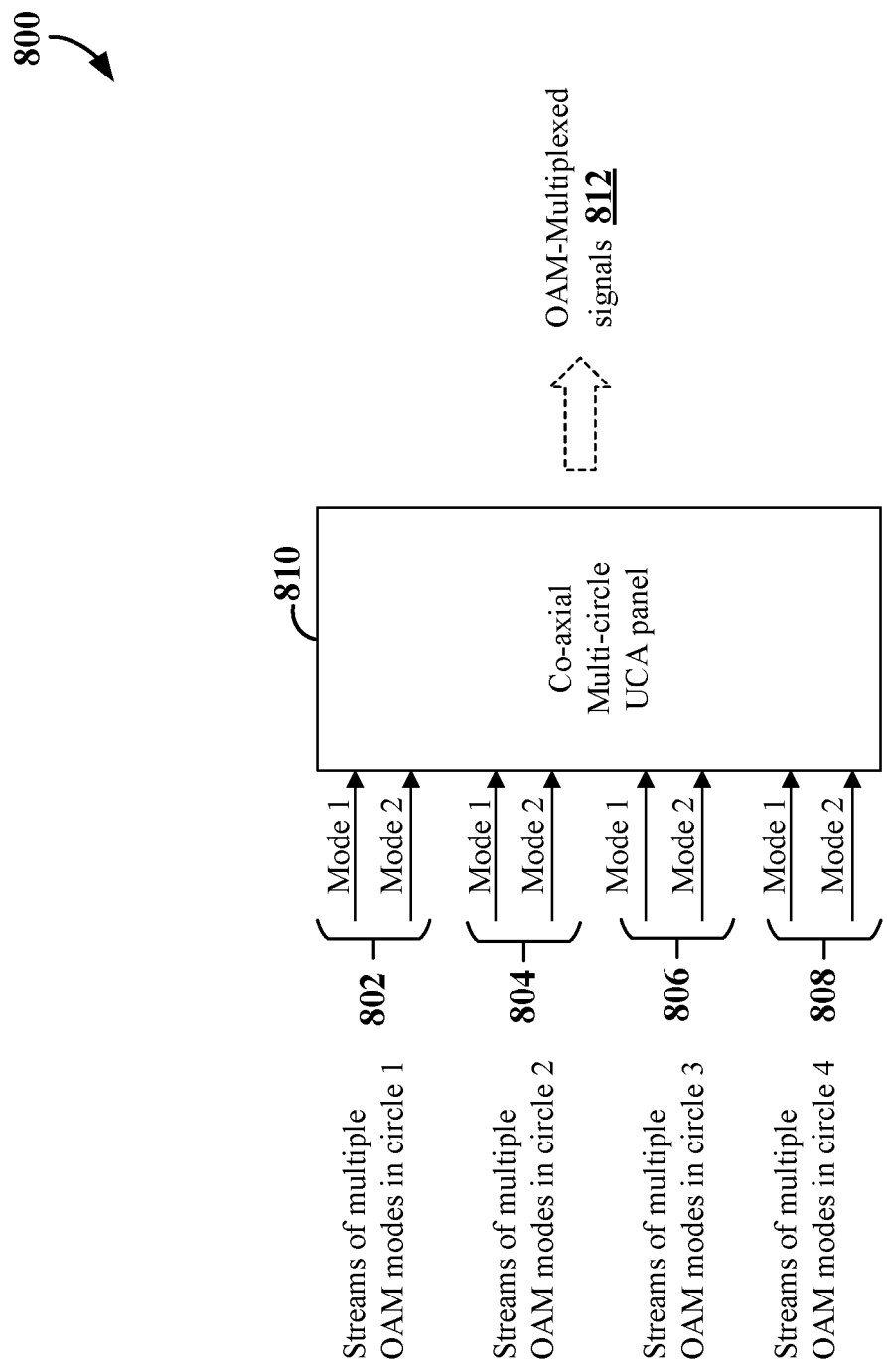
FIG. 8 is a block diagram illustrating an example of signal streams for different OAM modes according to some aspects.

FIG. 8 is a block diagram illustrating an example 800 of signal streams for different OAM modes that may be transmitted by a set of UCA antennas. In some examples, a first DFT circuit (e.g., of the first set of DFT circuits 726 of FIG. 7) may generate streams based on multiple OAM modes 802 for a first UCA antenna (e.g., the first UCA antenna 708 of FIG. 7), a second DFT circuit may generate streams based on multiple OAM modes 804 for a second UCA antenna (e.g., the second UCA antenna 710), a third DFT circuit may generate streams based on multiple OAM modes 806 for a third UCA antenna (e.g., the third UCA antenna 712), and a fourth DFT circuit may generate streams based on multiple OAM modes 808 for a fourth UCA antenna (e.g., the fourth UCA antenna 714). These streams are transmitted via a co-axial multi-circle UCA panel 810 (e.g., the first set of UCA antennas 702) to provide OAM-multiplexed signals 812 (e.g., LOS MIMO beams).

In some examples, the intra-circle streams (e.g., the streams for the first UCA antenna 708, or the streams for the second UCA antenna 710, etc.) are orthogonal to one another. In some examples, the inter-circle streams (e.g., the streams for the first UCA antenna 708 with respect to the streams for the second UCA antenna 710, etc.) are orthogonal for different OAM modes and non-orthogonal for the same OAM mode. Thus, for each OAM mode, there may be inter-circle interference. In particular, when the antennas are relatively close to each other, the mutual coupling between these antennas may negatively impact the quality of the desired transmit waveform.

Figure 9:
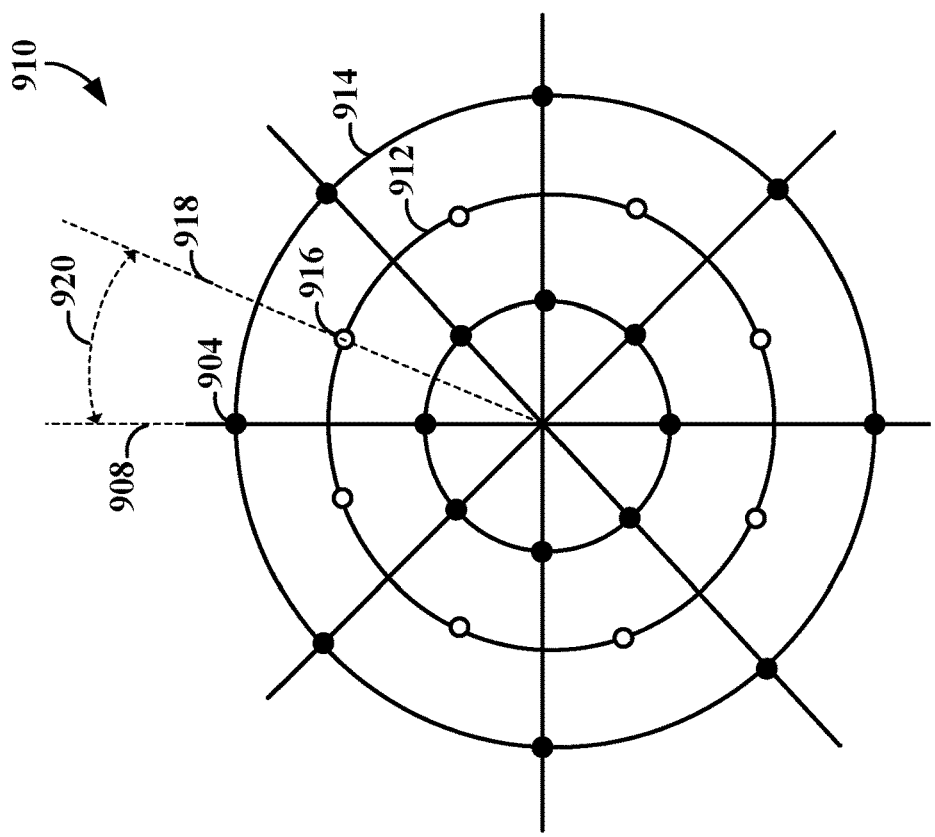
FIG. 9 is a schematic illustration of an example of antennas for OAM multiplexing according to some aspects.
Figure 9:
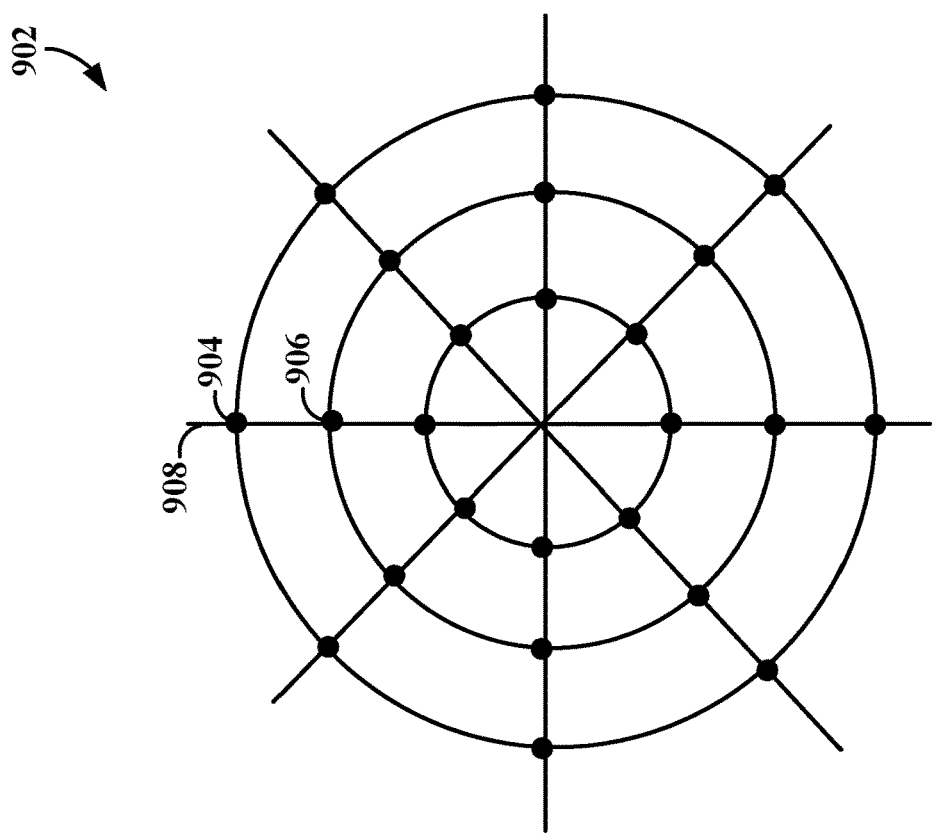

FIG. 9 is a schematic illustration of example UCA antennas for OAM multiplexing according to some aspects. In a first set of UCA antennas 902, the concentric UCA antennas are angularly aligned whereby a given radial line that intersects an antenna element for one UCA antenna will also intersect an antenna element for each of the other UCA antennas. For example, an antenna element 904 for the outer UCA antenna and an antenna element 906 for the middle UCA antenna both intersect the same radial line 908.

In contrast, in a second set of UCA antennas 910, the antenna elements for different UCA antennas may be offset with respect to the radial lines. In this example, the antenna elements of the middle UCA antenna 912 are rotated with respect to the antenna elements of the outer UCA antenna 914. For example, the antenna element 904 of the outer UCA antenna 914 is on the radial line 908. In contrast, an antenna element 916 of the middle UCA antenna 912 is on a radial line 918. Thus, there is a radial offset 920 between the antenna elements for the middle UCA antenna 912 and the antenna elements for the outer UCA antenna 914 (as well as the inner UCA antenna). In this example, an offset of ½ of the angular distance between the antenna elements of the outer UCA antenna 914 is used for the middle UCA antenna 912. This arrangement may have an advantage of maximizing the distance among antenna elements. Consequently, the mutual coupling (e.g., cross talk) between antenna elements of the different UCA antennas in the second set of UCA antennas 910 may be lower as compared to the first set of UCA antennas 902. Other offsets may be used in other examples (e.g., as discussed below in conjunction with FIG. 11).

Figure 10:
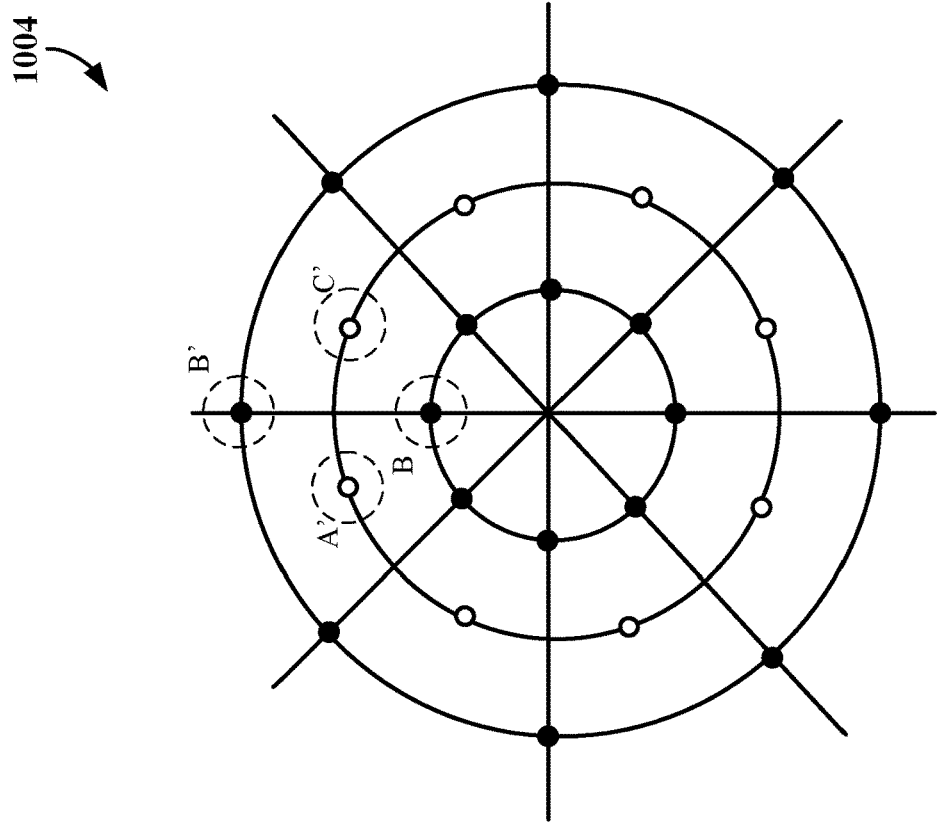
FIG. 10 is a schematic illustration of an example of antennas for OAM multiplexing according to some aspects.
Figure 10:
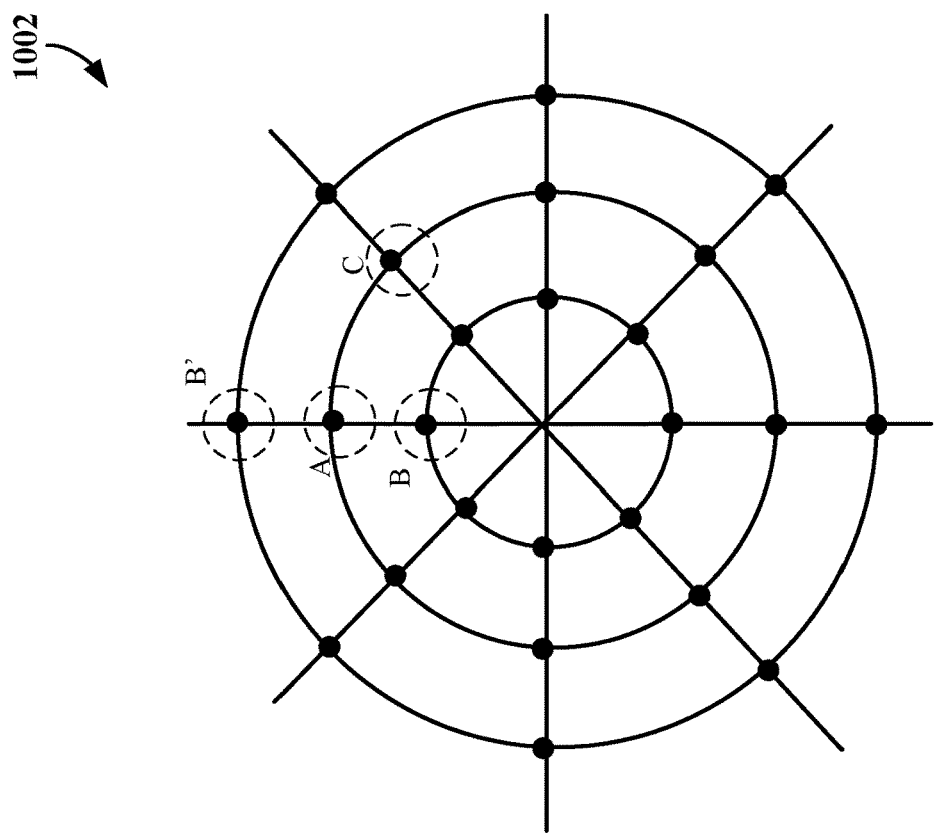

FIG. 10 is another schematic illustration of example antennas for orbital angular momentum (OAM) multiplexing according to some aspects. Similar to FIG. 9, FIG. 10 illustrates a first example 1002 where the UCA antennas are not radially offset from one another and a second example 1004 where one of the UCA antennas is radially offset from the other UCA antennas.

The first example 1002 illustrates an antenna element A (e.g., an antenna node) on an antenna panel with multiple concentric antenna circles, without an offset between the adjacent circles. The closest neighboring antenna elements to antenna element A are the antenna elements along the radius on the adjacent circles (e.g., antenna element B) and its adjacent nodes along the same circle (e.g., antenna element C). For the case where the number of antennas on a circle >6, the distance AC>the distance AB. To keep inter-antenna coupling to a reasonable level, the radius of the next circle may be restricted to be at least λ/2 (half the wavelength of a reference frequency for the signals carried by the UCA antennas).

In contrast, in the second example 1004 where there is an angular offset between the adjacent antenna circles, the distances between the antenna elements on adjacent circles may be larger. For example, the distance A'B of the second example 1004 is greater than the distance AB of the first example 1002. Thus, the radial distance between the two circles could be made smaller in this case as compared to the first example 1002 (smaller radial distance not shown). For example, the radial distance between antenna element B and antenna element B' in the second example 1004 (as opposed to the radial distance between antenna element B and antenna element A in the first example 1002) may be restricted to be at least λ/2. Thus, a 100% packing gain may be achieved (e.g., 100% more circles may be packed in a set of UCA antennas) by using an offset that staggers antenna elements of the circles by placing the node in the next circle in the middle (angular wise). An even higher gain may be achieved if more than one offset or multiple circles with radius much larger than λ can be used.

Figure 11:
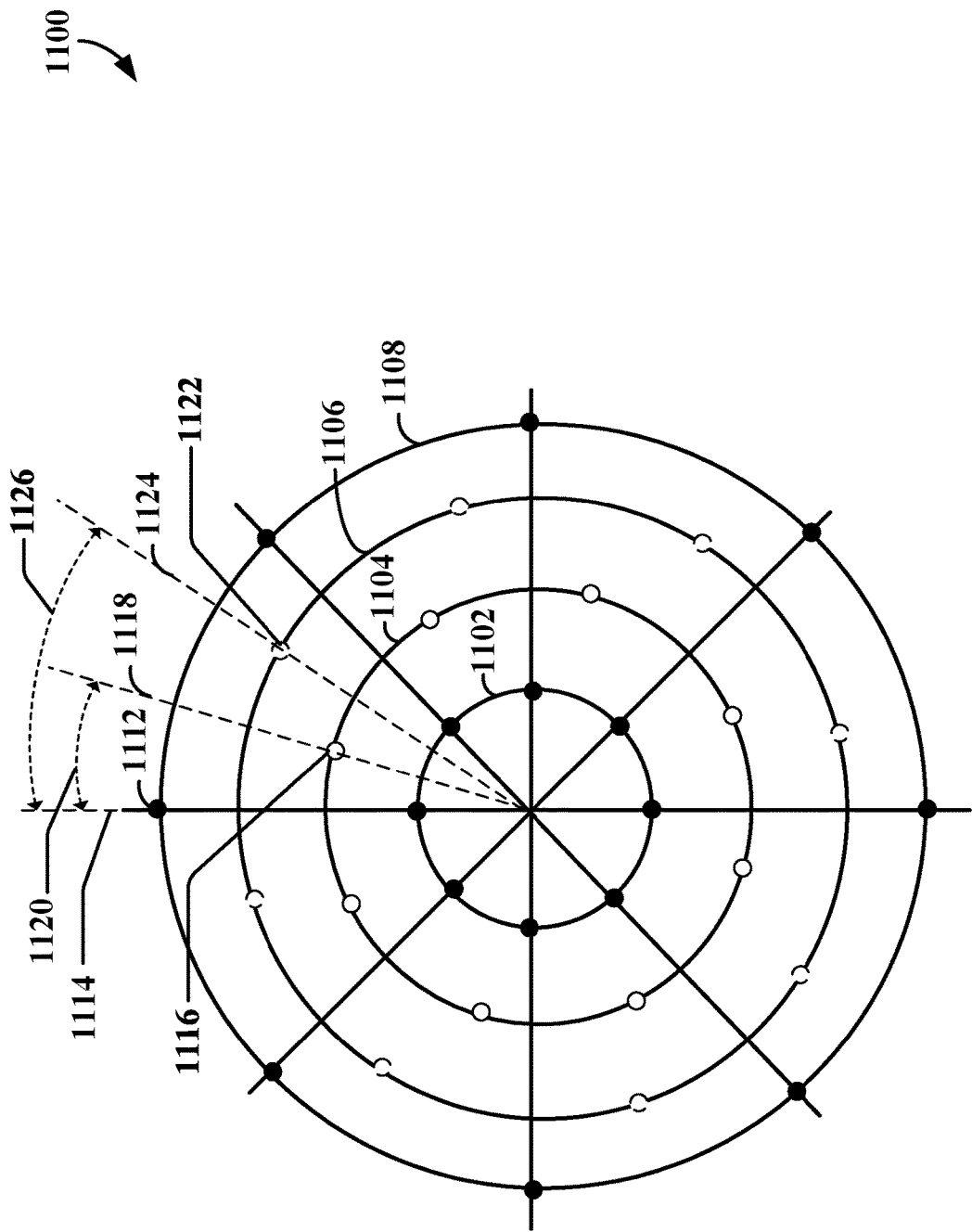
FIG. 11 is a schematic illustration of an example of an antenna for OAM multiplexing that employs angular offsets for different antenna circles according to some aspects.

FIG. 11 is a schematic illustration of an example of a set of UCA antennas 1100 for OAM multiplexing that employs multiple angular offsets for different antenna circles. In this example, the set of UCA antennas 1100 includes a first UCA antenna 1102, a second UCA antenna 1104, a third UCA antenna 1106, and a fourth UCA antenna 1108. In this case, the antenna elements of the second UCA antenna 1104 are rotated with respect to the antenna elements of the fourth UCA antenna 1108 (and the first UCA antenna 1102). In addition, the antenna elements of the third UCA antenna 1106 are rotated with respect to the antenna elements of the fourth UCA antenna 1108 (and the first UCA antenna 1102).

For example, an antenna element 1112 of the fourth UCA antenna 1108 is on a radial line 1114 (e.g., corresponding to a reference angle). In contrast, an antenna element 1116 of the second UCA antenna 1104 is on a radial line 1118. Thus, there is a radial offset 1120 between the antenna elements for the second UCA antenna 1104 and the antenna elements for the fourth UCA antenna 1108 (as well as the first UCA antenna 1102). In this example, an offset of ⅓ of the angular distance between the antenna elements of the fourth UCA antenna 1108 is used for the second UCA antenna 1104.

In addition, an antenna element 1122 of the third UCA antenna 1106 is on a radial line 1124. Thus, there is a radial offset 1126 between the antenna elements for the third UCA antenna 1106 and the antenna elements for the fourth UCA antenna 1108 (as well as the first UCA antenna 1102). In this case, an offset of ⅔ of the angular distance between the antenna elements of the fourth UCA antenna 1108 is used for the third UCA antenna 1106.

Smaller offsets such as ¼, etc., may be used in other examples (e.g., as long as the minimum distance among nearest antenna element pairs is at least λ/2). Also, in the event the antenna radius is relatively large, the radial distance between adjacent circles may be much smaller than λ/2. In this case, the packing gain may be higher than 100%.

In view of the above, using an offset between the multiple circles on a transmit antenna panel and/or between multiple circles on a receive antenna panel may provide a significant gain in terms of the number of circles or antennas that can be packed, given a certain minimum separation constraint. As discussed above, radial offsets my provide more space and separation among antennas and reduce inter-antenna coupling. Moreover, there may be no loss of orthogonality in some examples.

Figure 12:
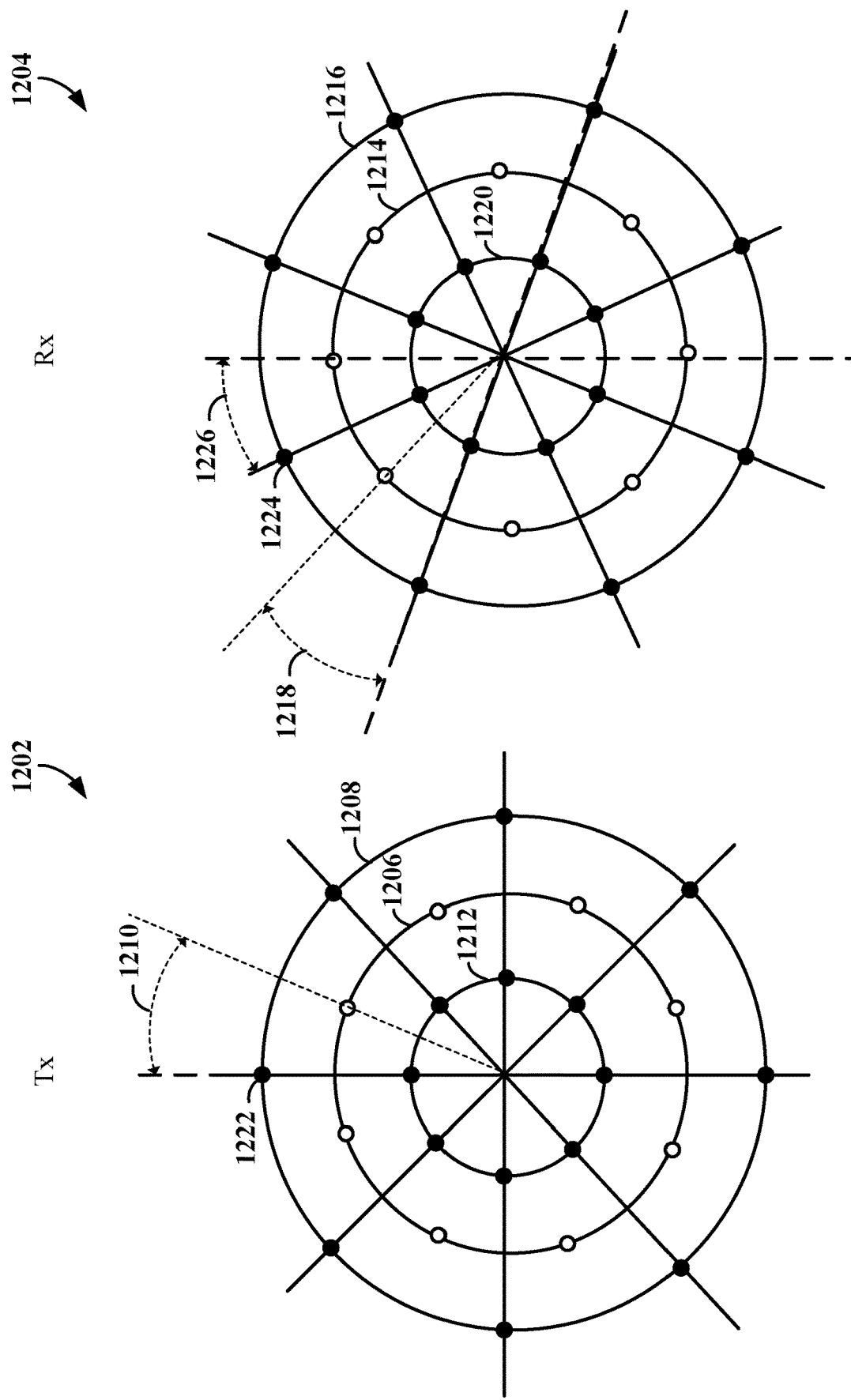
FIG. 12 is a schematic illustration of an example of offset transmit and receive antennas according to some aspects.

FIG. 12 is a schematic illustration of an example of an antenna system that includes a first antenna 1202 (e.g., a transmit antenna) and a second antenna 1204 (e.g., a receive antenna). In some examples, the first antenna 1202 and the second antenna 1204 are located in different devices (e.g., a first device transmits signals via the first antenna 1202 and a second device receives these signals via the second antenna 1204). In some examples, the first antenna 1202 and the second antenna 1204 are located in the same device (e.g., a first device transmits first signals via the first antenna 1202 to a second device and receives second signals via the second antenna 1204 from the second device).

In the first antenna 1202, one of the UCA antennas is radially offset from the other UCA antennas. Specifically, the antenna elements of a middle UCA antenna 1206 are rotated with respect to the antenna elements of an outer UCA antenna 1208. Thus, there is a radial offset 1210 between the antenna elements for the middle UCA antenna 1206 and the antenna elements for the outer UCA antenna 1208 (as well as an inner UCA antenna 1212).

In the second antenna 1204, one of the UCA antennas is radially offset from the other UCA antennas. Specifically, the antenna elements of a middle UCA antenna 1214 are rotated with respect to the antenna elements of an outer UCA antenna 1216. Thus, there is a radial offset 1218 between the antenna elements for the middle UCA antenna 1214 and the antenna elements for the outer UCA antenna 1216 (as well as an inner UCA antenna 1220).

FIG. 12 also illustrates an example where there is an angular offset between the first antenna 1202 and the second antenna 1204. For example, a first Tx antenna 1222 of the outer UCA antenna 1208 may be rotated with respect to a first Rx antenna 1224 of the outer UCA antenna 1216 by a radial offset 1226. Other offsets may be used in other examples. In some examples (e.g., where there is interference between OAM modes at the receiver), the offset between the first antenna 1202 and the second antenna 1204 may be substantially (e.g., within 5% of)±π/2N, where N is the number of antennas on each UCA antenna. In some examples, the radial offset 1210 used for the middle UCA antenna 1206 may be different from the radial offset 1218 offset used for the middle UCA antenna 1214.

Figure 13:
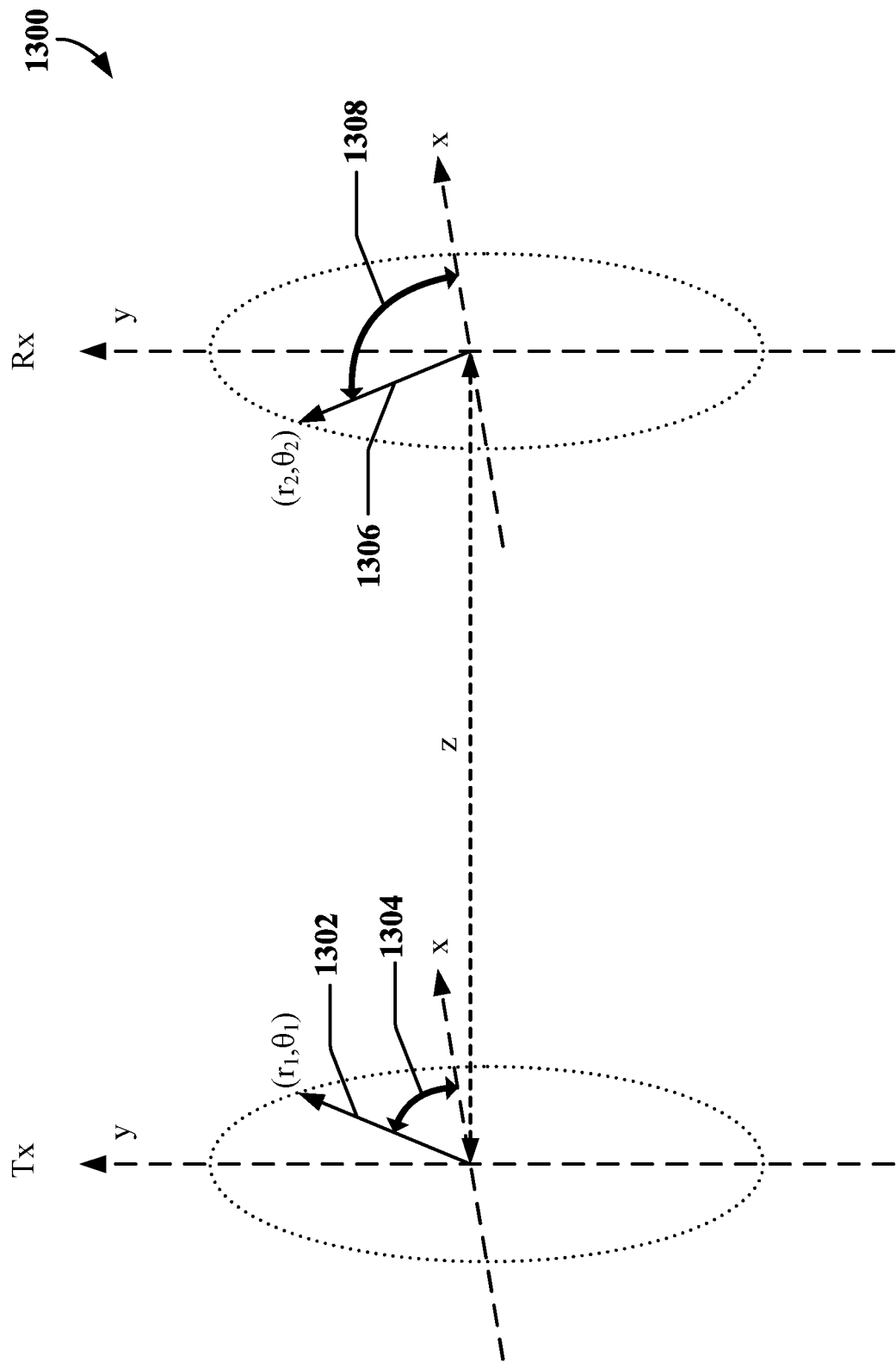
FIG. 13 is a conceptual illustration of an example of an offset between a transmit antenna and a receive antenna according to some aspects.

As discussed below, orthogonality between OAM modes may be maintained when there is a radial offset between the transmit and receive antennas. FIG. 13 illustrates an example 1300 of a radial offset between a transmit (Tx) antenna and a receive (Rx) antenna. Here, the Tx antenna has a radius $r_1$ 1302 and an offset $\theta_1$ 1304 with respect to the x axis. In contrast, the receive antenna has a radius $r_2$ 1306 and an offset $\theta_2$ 1308 with respect to the x axis. The transmit and receive antennas are separated by a distance z.

Based on the theory of the Green function (a waveform from a single point source with the same boundary condition), the equation $\nabla^2 v + k^2 v = 0$ can be solved in an integral form, which is equivalent to the Huygens-Fresnel principle. The signal at a receiver plane v can be written as a function of a transmitter signal u as:

$$v = \int\int u \frac{\exp(jkr)}{r} \psi dS \qquad \text{EQUATION 1}$$

Here, $\psi = \cos\theta$ or some other function of the angle of propagation close to $\cos\theta$. In some examples, ω≈1. This integral form may simplify simulation operations, but it might not correspond to a solution form (e.g., when the transceivers are discrete devices). Eigen modes may be found by a singular value decomposition (SVD) of the transfer matrix. It may be a considered that the Gaussian term is present in the eigenvectors.

For a scenario with N Tx and N Rx antennas, with $\theta_1$ corresponding to the Tx phase and $\theta_2$ corresponding to the Rx phase, $r_1$ corresponding to the Tx radius and $r_2$ corresponding to the Rx radius, and z corresponding to the distance between the antennas (e.g., as depicted in FIG. 13), the transfer matrix H discussed above can be found as (ignoring the cosine factor in the amplitude in Huygens-Fresnel formula):

$$H_{m,n} \propto \frac{\exp\left(jk\sqrt{z^2 + (r_1 \cos\theta_1 - r_2 \cos\theta_2)^2 + (r_1 \sin\theta_1 - r_2 \sin\theta_2)^2}\right)}{\sqrt{z^2 + (r_1 \cos\theta_1 - r_2 \cos\theta_2)^2 + (r_1 \sin\theta_1 - r_2 \sin\theta_2)^2}} = \frac{\exp\left\{jk\sqrt{z^2 + r_1^2 + r_2^2 - 2r_1 r_2 \cos(\theta_1 - \theta_2)}\right\}}{\sqrt{z^2 + r_1^2 + r_2^2 - 2r_1 r_2 \cos(\theta_1 - \theta_2)}}$$

EQUATION 2

Assuming that H is cyclic, this implies that its eigenvectors are discrete Fourier transform (DFT) vectors:

$$v_\mu = \exp\left\{j\frac{2\pi\mu v}{N}\right\},$$

EQUATION 3

Here, $\mu$ and $v$ may be integers within a range (e.g., $\mu$=0, 1, ... (N−1), v=0, 1, ... (N−1)), where $\mu$ is the vector index of a DFT vector, and $v$ is the element index in each DFT vector.

With respect to each OAM mode, the p-th DFT vector may correspond to the $\mu$-th OAM waveform. In some examples, with N transmitter antennas and N receiver antennas, all OAM modes 0, 1, . . . , N−1 may be orthogonal at the receiver if any of them are transmitted, regardless of the distance z and the radii of the transmitter and receiver circles. In some examples, the orthogonality may hold as long as the center of the Tx circle and the center of the Rx circle are along a common z-axis (e.g., perpendicular to the Tx antenna panel and the Rx antenna panel). Also, this orthogonality may hold when the Rx circle has a rotation along the z-axis with respect to the Tx circle. In some examples, the radius of the Rx circle and the radius of the Tx circle may be different.

In some aspects, a Tx antenna to Rx antenna offset may be specified without regard to the intra-antenna offset (e.g., the radial offset 1210 or the radial offset 1218 of FIG. 12). For example, in some cases, the use of different Tx antenna to Rx antenna offsets may have a relatively minor effect on any aliasing (e.g., spatial aliasing) that may occur when using such a Tx and Rx antenna pair.

Aliasing may involve interference or inaccuracies in decoding a waveform due to insufficient sampling of the waveform along a space axis (e.g., when a UCA receiver samples a waveform at each antenna element of a receive antenna). A UCA transmitter may attempt to generate an OAM waveform that is a continuous helical waveform in space. However, an actual OAM waveform generated using a finite number of transmit antenna elements may be discrete in space, which may cause aliasing. For example, each transmit antenna element may generate a signal and a harmonic of the signal, which may be based on an angle of the respective transmit antenna in the transmitter circle (e.g., the waveform may be a function of space). The UCA receiver may sample one or more signals received from the UCA transmitter at each receive antenna element. The UCA receiver may see fluctuations or oscillations in the OAM modes used for communications due to interference received by the finite receive antenna elements (e.g., the receive antenna elements may receive additional signaling or interference different than the intended OAM mode or they might not capture signaling that is part of the intended OAM mode). In some examples, a higher-order OAM mode (e.g., an OAM mode with an index greater than eight) may interfere with a lower-order OAM mode. The UCA receiver might not be able to distinguish the correct OAM mode from the interfering signals corresponding to other OAM modes. For example, due to the use of a finite number of samples, the receiver may be unable to differentiate signals generated in accordance with OAM modes corresponding to a faster oscillation from signals generated in accordance with OAM modes corresponding to a slower oscillation.

In some examples, aliasing may occur in scenarios where the antenna subarrays at the receiving device are located at angular positions along the perimeter of the receive antenna that are the same as the angular positions along the perimeter of the antenna subarrays at the transmitting device. The disclosure relates in some aspects to using an angular offset to mitigate this aliasing.

As discussed above, an angular offset may be applied between each antenna subarray of the transmitting device and each antenna subarray of the receiving device. In some aspects, the use of such an angular offset may enable the receiving device to receive and decode a more accurate representation of the transmitted signal with fewer aliasing effects, as compared to a scenario where the transmit antenna elements and the receive antenna elements are angularly aligned. The use of such an angular offset may also result in reduced noise in the received signal and a smoother received signal. For example, the angular offset may position the receive antenna subarrays at one or more locations at which an amplitude of the received waveform may be higher and/or where there is less interference from higher periodicities of the waveform (as compared to a scenario where the receive antenna elements and the transmit antenna elements are aligned).

The mode response of each transmitter and receiver circle pair, as described according to Equation 3, may be further analyzed according to Equation 4, which utilizes Taylor expansion approximations.

$$\sqrt{z^2 + r_1^2 + r_2^2 - 2r_1 r_2 \cos(\theta_1 - \theta_2)} = $$
$$z\sqrt{1 + \frac{r_1^2 + r_2^2 - 2r_1 r_2 \cos(\theta_1 - \theta_2)}{z^2}} \approx$$
$$z\left(1 + \frac{r_1^2 + r_2^2 - 2r_1 r_2 \cos(\theta_1 - \theta_2)}{2z^2}\right) =$$
$$Z + \frac{r_1^2 + r_2^2}{2z} - \frac{r_1 r_2 \cos(\theta_1 - \theta_2)}{z}$$

EQUATION 4

Equation 4 may then be incorporated into Equation 2, yielding Equation 5 as shown below.

$$H_{m,n} \propto \frac{\exp\left\{jk\sqrt{z^2 + r_1^2 + r_2^2 - 2r_1 r_2 \cos(\theta_1 - \theta_2)}\right\}}{\sqrt{z^2 + r_1^2 + r_2^2 - 2r_1 r_2 \cos(\theta_1 - \theta_2)}} \approx$$
$$\frac{\exp\left\{jkz\sqrt{1 + \frac{r_1^2 + r_2^2 - 2r_1 r_2 \cos(\theta_1 - \theta_2)}{z^2}}\right\}}{z + \frac{r_1^2 + r_2^2}{2z} - \frac{2r_1 r_2 \cos(\theta_1 - \theta_2)}{z}} \approx$$

EQUATION 5

-continued $$\frac{\exp\left\{jk\left(z+\frac{r_1^2+r_2^2}{2z}\right)\right\}}{z}\exp\left\{\frac{-jkr_1r_2\cos(\theta_1-\theta_2)}{z}\right\}$$

The above approximation follows the commonly used par-axial approximation in Fourier optics, which is essentially Taylor expansion to the second degree.

Assuming a discrete transmitter circle at the transmitting device, with antenna subarrays $$\theta_1 = \frac{2\pi p}{N}$$

and $$\theta_2 = \frac{2\pi n}{N},$$

where p=0, 1, ... (N−1) and n=0, 1, ... (N−1), if a phase of $e^{jl\theta_1}$ is applied by the transmitting device, a total received signal at a receive location of $\theta_2$ on the receiver circle may be represented by Equation 6.

$$\int_0^{2\pi} exp\{-jB\cos(\theta_1-\theta_2)\}\exp(jl\theta_1)d\theta_1 = \quad \text{EQUATION 6}$$

$$\exp(jl\theta_2)\int_0^{2\pi}\exp\{-jB\cos\theta_1'\}[\cos l\theta_1'+j\sin l\theta_1']d\theta_1'$$

Since $\int_0^\pi e^{j\beta\cos x}\cos lx\,dx = j^n\pi J_l(\beta)$, then $\int_{-\pi}^\pi e^{j\beta\cos x}\cos lx\,dx = j^l 2\pi J_l(\beta)$ Also $\int_{-\pi}^\pi e^{j\beta\cos x}\cos lx\,dx = 0$, because sin $lx$ is odd Thus, $\int_0^{2\pi}\exp\{-jB\cos(\theta_1-\theta_2)\}\exp(jl\theta_1)d\theta_1 = (-j)^l 2\pi J_l(B)\exp(jl\theta_2)$ For receive beamforming (with continuous phase), a phase of $\exp\{-jl\theta_2\}$ may be applied. Thus, the total received signal of the entire receive circle is in proportion to $(-j)^l 2\pi J_l(B)$.

In the example of Equation 6, B may be represented by $$B = 2\pi\frac{r_1 r_2}{\lambda z}.$$

However, with discrete sampling by the antenna elements (e.g., discrete antenna elements located at $$\theta_1 = \frac{2\pi p}{N},$$

with p=0, 1, ... (N−1)), aliasing may exist. Aliasing may be present when the mode index, l, has a periodicity of N. For example, the received signal at a receive location of $\theta_2$ on the receiver circle when discrete sampling is applied may be represented by Equation 7.

$$\frac{1}{\sqrt{N}}\sum_{p=0}^{N-1}\exp\left\{j\frac{2\pi pl}{N}\right\}\exp\left\{-j2\pi\frac{r_1 r_2}{\lambda z}\cos\left(\frac{2\pi p}{N}-\theta_2\right)\right\} \sim \quad \text{EQUATION 7}$$

$$\Sigma_{v=-\infty}^\infty J_{l+vN}(B)(-j)^{(l+vN)}e^{j(l+vN)\theta_2} =$$

$$\Sigma_{v=-\infty}^\infty J_{l+vN}(B)e^{j(l+vN)\left(-\frac{\pi}{2}+\theta_2\right)}$$

The value of the angular offset to be used to mitigate aliasing may be based on an analysis of the received signal at the UCA receiver (e.g., when a quantity, N, of antenna elements at the UCA transmitter and the UCA receiver is even) to improve the accuracy of the communications. The received signal at the $n^{th}$ receive antenna element of N receive antenna elements, where the $n^{th}$ receive antenna element is at an angle of $$\theta_2 = \frac{2\pi m}{M}+\theta_0,$$

may be defined according to Equation 8.

EQUATION 8

$$Er(\varphi_n) = J_l(B)(-j)^l e^{jl\left(\frac{2\pi n}{N}+\theta_0\right)} + \sum_{\substack{v=-\infty \\ v\neq 0}}^\infty J_{l+vN}(B)(-j)^{(l+vN)}e^{j(l+vN)\left(\frac{2\pi n}{N}+\theta_0\right)}$$

$$= (-j)^l e^{jl\left(\frac{2\pi n}{N}+\theta_0\right)}\left[J_l(B)+\sum_{\substack{v=-\infty \\ v\neq 0}}^\infty, J_{l+vN}(B)(-j)^{vN}e^{jvN\left(\frac{2\pi n}{N}+\theta_0\right)}\right]$$

$$= (-j)^l e^{jl\left(\frac{2\pi n}{N}+\theta_0\right)}\left[J_l(B)+\sum_{\substack{v=-\infty \\ v\neq 0}}^\infty, J_{l+vN}(B)(-j)^{vN}e^{jvN\theta_0}\right]$$

In a scenario with the same number (N) of Tx antennas and Rx antennas on respective circles (the radius of the Tx and Rx circles can be arbitrary), for receive beamforming with N discrete antennas:

for mode $l$, using $\exp\left[-jl\left(\frac{2\pi n}{M}+\theta_0\right)\right]$ \quad EQUATION 9

$$\sum_{n=0}^{N-1}Er(\varphi_n)\exp\left[-jl\left(\frac{2\pi n}{M}+\theta_0\right)\right] =$$

$$N(-j)^l\left[J_l(B)+\sum_{\substack{v=-\infty \\ v\neq 0}}^\infty, J_{l+vN}(B)(-j)^{vN}e^{jvN\theta_0}\right]$$

for mode $l' \neq l$, using $\exp\left[-jl'\left(\frac{2\pi n}{M}+\theta_0\right)\right]$ $$\sum_{n=0}^{N-1}Er(\varphi_n)\exp\left[-jl'\left(\frac{2\pi n}{M}+\theta_0\right)\right] = 0$$

The aliasing terms create interference to the intended mode, but do not affect orthogonality among different modes. Thus, under par-axial approximation, aliasing may have no impact on the choice of the multi-circle offset. The Tx-Rx offset can be chosen in the same way without considering the multi-circle offset.

The aliasing terms of Equation 7 (with v≠0) may have the following properties:

$$J_\alpha(B) \approx \sqrt{\frac{2}{\pi B}}\left(\cos\left(B-\frac{\alpha\pi}{2}-\frac{\pi}{4}\right)+e^{|Im(Z)|}O(|B|^{-1})\right)$$

With the asymptotic property of the Bessel function:

EQUATION 10

$$J_{l+vN}(B) - J_{l-vN}(B) \sim$$

$$\sqrt{\frac{2}{\pi B}} \left[ \cos\left(B - \frac{(l+vN)\pi}{2} - \frac{\pi}{4}\right) - \cos\left(B - \frac{(l-vN)\pi}{2} - \frac{\pi}{4}\right) \right] =$$

$$2\sqrt{\frac{2}{\pi B}} \sin\left(B - \frac{l\pi}{2} - \frac{\pi}{4}\right) \sin\left(\frac{\pi vN}{2}\right)$$

For N even, and all $v = 1, 2, 3, \ldots$, $$\sin\left(\frac{\pi vN}{2}\right) = 0, \text{ it follows that } J_{l+vN}(B) \approx J_{l-vN}(B).$$

For $J_{l+(v+1)N}(B) - J_{l+vN}(B) \sim$ $$\sqrt{\frac{2}{\pi B}} \left[ \cos\left(B - \frac{(l+(v+1)N)\pi}{2} - \frac{\pi}{4}\right) - \cos\left(B - \frac{(l+vN)\pi}{2} - \frac{\pi}{4}\right) \right] =$$

$$2\sqrt{\frac{2}{\pi B}} \sin\left(B - \frac{(l+(v+1/2)N)\pi}{2} - \frac{\pi}{4}\right) \sin\left(\frac{\pi N}{2}\right)$$

when N is a multiple of 4, $J_{l+(v+1)N}(x) \approx J_{l+vN}(Bx)$.

Two examples of a choice for the angular offset follow for the case where M=N and the case where M≠N.

With M=N, $$Er(\varphi_n) = \sum_{v=-\infty}^{\infty} J_{l+vN}(B) e^{j(l+vN)\left(-\frac{\pi}{2}+\theta_0\right)} e^{\frac{2\pi l n}{N}}$$ EQUATION 11

With an offset $\theta_0$, evaluating $$e^{j(l+vN)\left(-\frac{\pi}{2}+\theta_0\right)}$$

and $$e^{j(l+vN)\left(-\frac{\pi}{2}+\theta_0\right)},$$

it may be desirable to have $e^{jvN\theta_0} = -e^{jlvN74}{}_0 \Rightarrow e^{j(2vN\theta_0)} = -1$. In this case, $$\theta_0 = \frac{\pm(2n+1)\pi}{2vN},$$

which might not be met for all values of v (i.e., v=1, 2, 3 . . . ).

By selecting $$\theta_0 = \pm\frac{\pi}{2N}:$$

for all odd v, including v=±1, the aliasing terms N and −N tend to cancel each other. Thus, aliasing may be mitigated using such an offset.

The offset might not be applied to polarization. For example, two polarization modes can be used for each OAM mode and the Tx and Rx polarizations may be aligned.

For the M≠N scenario, M=KN or N=KM. In this case, the first non-zero aliasing term is indexed $$v_{min} = \frac{M}{gcd(M, N)}.$$

In some examples, the following relationship may be desirable: $e^{jv_{min}N\theta_0} = -e^{-jv_{min}N\theta_0} \Rightarrow e^{j(2v_{min}N\theta_0)} = -1$. In this case, $$\theta_0 = \frac{\pm(2n+1)\pi}{2v_{min}N},$$

which might not be met for all values of v (i.e., v=1, 2, 3 . . . ).

By selecting $$\theta_0 = \pm\frac{\pi}{2Nv_{min}N}:$$

for all odd multiples of $v_{min}$, including v=±$v_{min}$, ±3$v_{min}$, ±5$v_{min}$, . . . , the aliasing terms N and −N tend to cancel each other. Thus, aliasing may be mitigated using such an offset. If $v_{min}$ is relatively large, then aliasing may occur for very high modes and is naturally suppressed.

Again, the offset might not be applied to polarization. For example, two polarization modes can be used for each OAM mode and the Tx and Rx polarizations may be aligned.

Summarizing the above aliasing analysis, in a system including Tx antennas and Rx antennas, an offset may be selected that minimizes the aliasing in the system.

Figure 14:
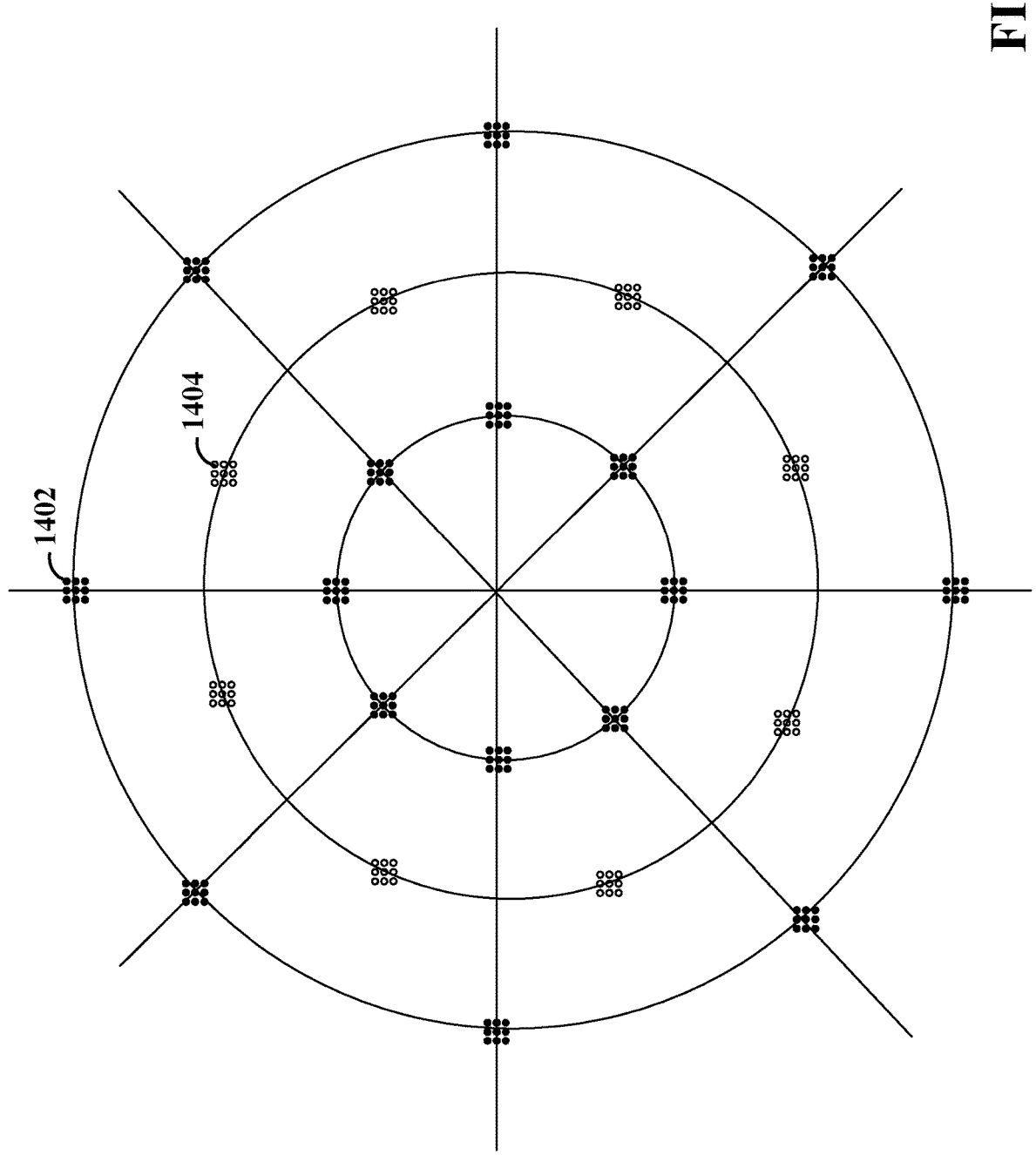
FIG. 14 is a schematic illustration of an example of an antenna for OAM multiplexing that employs arrayed antenna elements according to some aspects.

FIG. 14 is a schematic illustration of an example of an antenna 1400 for orbital angular momentum (OAM) multiplexing that employs arrayed antenna elements according to some aspects. As indicated each antenna element (e.g., antenna elements 1402 and 1404) may consist of a subarray of antenna element in some examples.

Figure 15:
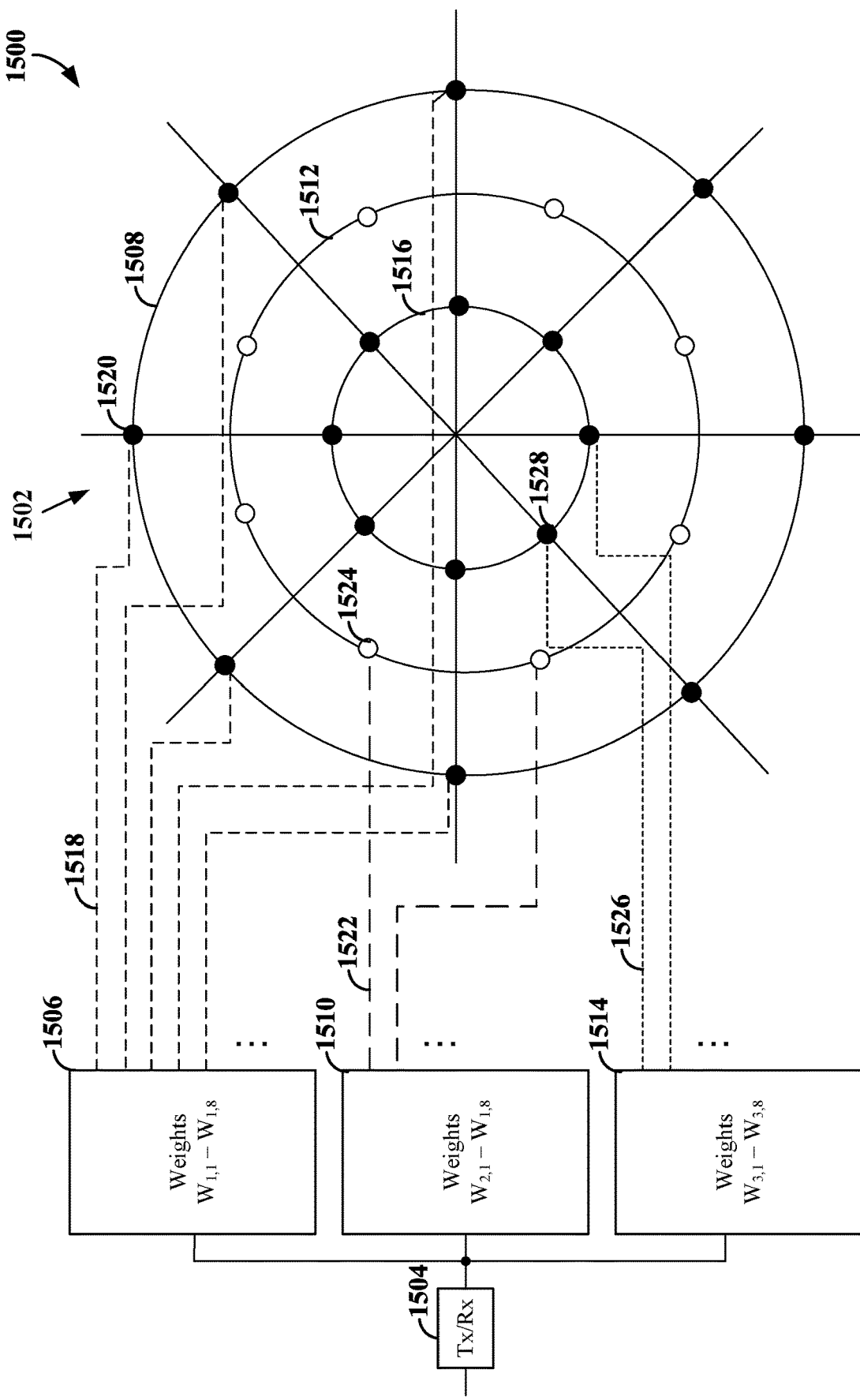
FIG. 15 is a schematic illustration of an example of an antenna circuit for OAM multiplexing according to some aspects.

FIG. 15 is a schematic illustration of an example of an antenna circuit 1500 for OAM multiplexing according to some aspects. In this example, a set of UCA antennas 1502 may receive signals from a transmitter (e.g., represented by Tx/Rx circuit 1504) and/or provide signals to a receiver (e.g., represented by Tx/Rx circuit 1504). In some examples, different sets of weight may be applied to different UCA antennas of the set of UCA antennas 1502. For example, a first set of weights 1506 may be used for a first UCA antenna 1508, a second set of weights 1510 may be used for a second UCA antenna 1512, and a third set of weights 1514 may be used for a third UCA antenna 1516. Here, a different weight may be applied to each antenna element. For example, a weight 1518 may be used for an antenna element 1520, a weight 1522 may be used for an antenna element 1524, and a weight 1526 may be used for an antenna element 1528.

Figure 16:
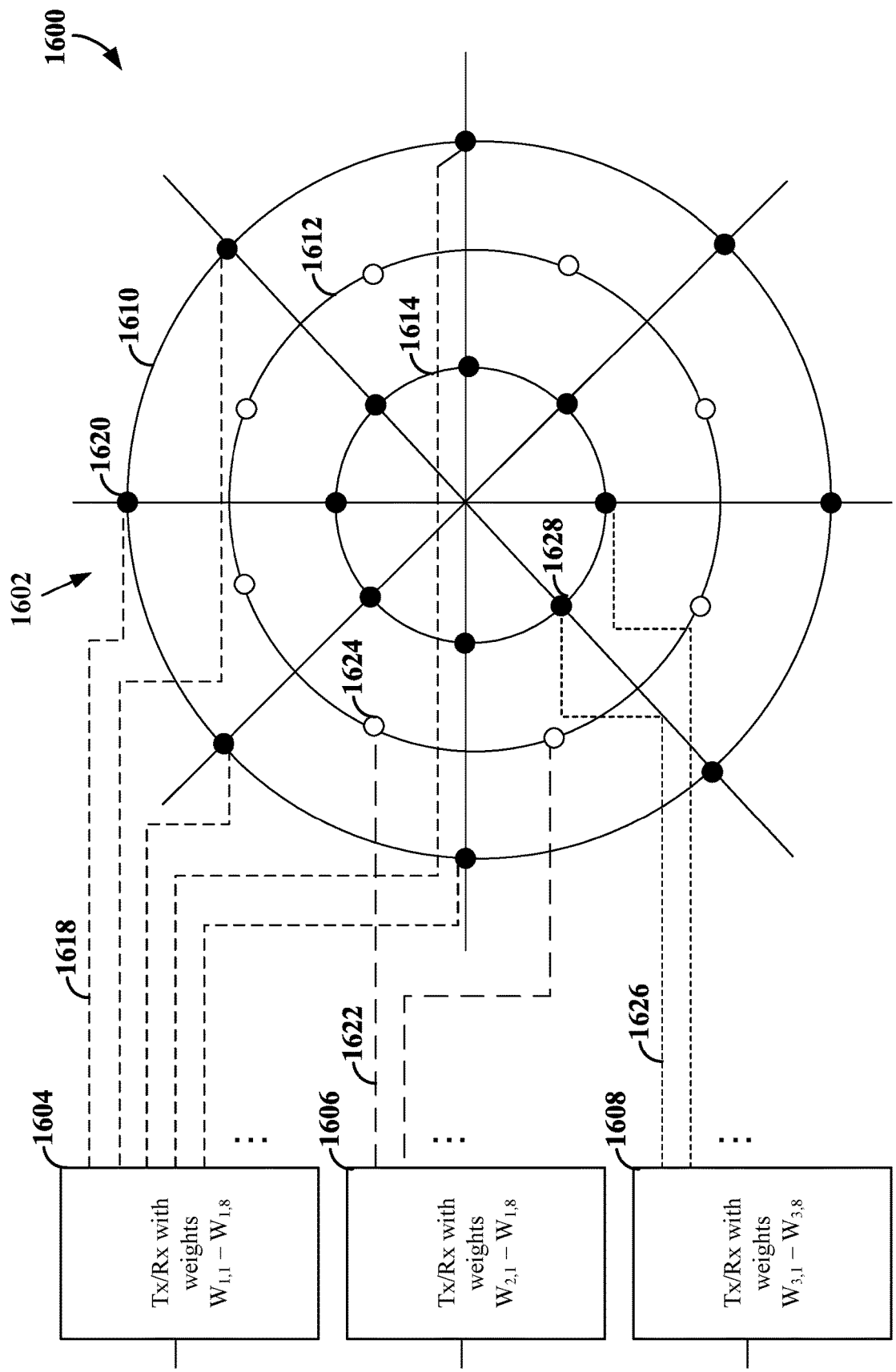
FIG. 16 is a schematic illustration of another example of an antenna circuit for OAM multiplexing according to some aspects.

FIG. 16 is a schematic illustration of an example of an antenna circuit 1600 for OAM multiplexing according to some aspects. In this example, each UCA antenna of a set of UCA antennas 1602 may receive signals from corresponding transmitter (e.g., represented by Tx/Rx circuit 1604, 1606, or 1608) and/or provide signals to a corresponding receiver (e.g., represented by Tx/Rx circuit 1604, 1606, or 1608). In some examples, different sets of weights may be applied to different UCA antennas of the set of UCA antennas 1602. For example, a first set of weights may be used for a first UCA antenna 1610, a second set of weights may be used for a second UCA antenna 1612, and a third set of weights may be used for a third UCA antenna 1614. Here, a different weight may be applied to each antenna element. For example, a weight 1618 may be used for an antenna element 1620, a weight 1622 may be used for an antenna element 1624, and a weight 1626 may be used for an antenna element 1628.

An analysis of radial modes for an OAM antenna system that has M circles, where each circle includes N antenna elements, as discussed herein follows. A full channel matrix has a size of (MN)*(MN). But between each pair of circles m1, m2, the N*N submatrix is circulant. The full channel matrix is:

$$H = \begin{bmatrix} H_{11} & H_{12} & & H_{1M} \\ H_{21} & H_{22} & \ldots & H_{2M} \\ \ldots & \ldots & \ldots & \ldots \\ H_{M1} & H_{M2} & \ldots & H_{MM} \end{bmatrix} \quad \text{EQUATION 12}$$

In Equation 12, $H_{m_1 m_2}$ is a N*N circulant matrix whose element $(H_{m_1 m_2})_{n_1 n_2}$ is the complex channel gain between the Tx-Rx antenna pair $n_1 n_2$. Based on the previous result about DFT vectors being the eigenvectors of a circulant matrix, we have: $H_{m_1 m_2} e_p = h_{m_1 m_2, p} e_p$, where the p-th DFT vector $$e_p = \left\{ \exp\left(\frac{j 2\pi p q}{N}\right) \right\},$$

q=0, 1, . . . (N−1); $h_{m_1 m_2, p}$ is the p-th complex eigenvalue, which is the p-th value in the DFT of a row vector in $H_{m_1 m_2}$. From the above, $$h_{m_1 m_2, p} \propto J_p\left(\frac{2\pi r_1 r_2}{\lambda z}\right).$$

Consequently, the eigenvectors of H have the form of $\{x_1 e_p, x_2 e_p, \ldots x_m e_p\}^T$, p=0, 1, . . . (N−1). Regarding an analysis of the radial dimension, by definition:

$$\begin{bmatrix} H_{11} & H_{12} & & H_{1M} \\ H_{21} & H_{22} & \ldots & H_{2M} \\ \ldots & \ldots & \ldots & \ldots \\ H_{M1} & H_{M2} & \ldots & H_{MM} \end{bmatrix} \begin{bmatrix} x_1 e_p \\ x_2 e_p \\ \ldots \\ x_m e_p \end{bmatrix} = \begin{bmatrix} \sum_{k=1}^{M} h_{1k} x_k e_p \\ \sum_{k=1}^{M} h_{2k} x_k e_p \\ \ldots \\ \sum_{k=1}^{M} h_{Mk} x_k e_p \end{bmatrix} =$$

$$\begin{bmatrix} \sum_{k=1}^{M} h_{1k,p}(x_k / x_1)(x_1 e_p) \\ \sum_{k=1}^{M} h_{2k,p}(x_k / x_2)(x_2 e_p) \\ \ldots \\ \sum_{k=1}^{M} h_{Mk,p}(x_k / x_M)(x_M e_p) \end{bmatrix}$$

To have $\{x_1 e_p, x_2 e_p, \ldots x_M e_p\}^T$ as the eigenvector, it follows that:

$$\Sigma_{k=1}^{M} h_{1k,p}(x_k/x_1) = \Sigma_{k=1}^{M} h_{2k,p}(x_k/x_2) = \ldots \Sigma_{k=1}^{M} h_{m,k,p}(x_k/x_M) = \lambda_{\mu,p}.$$

In matrix form:

$$\begin{bmatrix} h_{11,p} & h_{12,p} & & h_{1M,p} \\ h_{21,p} & h_{22,p} & \ldots & h_{2M,p} \\ \ldots & \ldots & \ldots & \ldots \\ h_{M1,p} & h_{M2,p} & \ldots & h_{MM,p} \end{bmatrix} \begin{bmatrix} x_1 \\ x_2 \\ \ldots \\ x_M \end{bmatrix} = \begin{bmatrix} \lambda_{\mu,p} x_1 \\ \lambda_{\mu,p} x_2 \\ \ldots \\ \lambda_{\mu,p} x_M \end{bmatrix} \quad \text{EQUATION 13}$$

$$\begin{bmatrix} h_{11,p} - \lambda_{\mu,p} & h_{12,p} & & h_{1M,p} \\ h_{21,p} & h_{22,p} - \lambda_{\mu,p} & \ldots & h_{2M,p} \\ \ldots & \ldots & \ldots & \ldots \\ h_{M1,p} & h_{M2,p} & \ldots & h_{MM,p} - \lambda_{\mu,p} \end{bmatrix} \begin{bmatrix} x_1 \\ x_2 \\ \ldots \\ x_M \end{bmatrix} = 0$$

The parameters $\lambda_{\mu,p}$, μ=0, 1, 2, . . . , (M−1), p=0, 1, 2, . . . (N−1), are the eigenvalues of:

$$\begin{bmatrix} h_{11,p} & h_{12,p} & & h_{1M,p} \\ h_{21,p} & h_{22,p} & \ldots & h_{2M,p} \\ \ldots & \ldots & \ldots & \ldots \\ h_{M1,p} & h_{M2,p} & \ldots & h_{MM,p} \end{bmatrix} \quad \text{EQUATION 14}$$

where $h_{m_1 m_2, p}$ is the p-th eigenvalue of the block matrix $H_{m_1 m_2} e_p = h_{m_1 m_2, p} e_p$.

The overall structure of the eigenvalues of H is set forth above in Equation 12. The overall structure of the eigenvalues of H has the form of $\rho_{\mu,p} \otimes e_p$, where $\rho_{\mu,p}$ is μ-th eigenvector of the matrix of Equation 14. Here, $$h_{m_1 m_2, p} \propto J_p\left(\frac{2\pi r_1 r_2}{\lambda z}\right).$$

In this analysis of a complete beamforming solution for the antenna system, the following assumptions may apply. Both the transmitter and the receiver have M circles. There is no specific requirement on the radius of each circle (although the center is a radius-0 circle, and other circles may be optimally placed). Each circle has N elements uniformly placed. The alignment between Tx and Rx antenna may be co-axial and parallel, but antenna elements in the circles can be offset. As to the organization of the channel matrix (e.g., H described above), it is a full matrix: element wise, and an intermediate matrix: circle wise. For example, $H_{m_1 m_2}$ is an N*N circulant matrix whose element $(h_{m_1 m_2})_{n_1 n_2}$ is the complex channel gain between the Tx-Rx antenna pair $n_1 n_2$.

The MIMO modes may include the following azimuth modes and radial modes.

The azimuth modes are from 0 to (N−1) with phase difference of $$\frac{2\pi p}{N}, p = 0, 1, \ldots (N-1).$$

The beamforming vectors are eigenvectors: p-th DFT vector $$e_p = \left\{ \exp\left(\frac{j 2\pi p q}{N}\right) \right\}, q = 0, 1, \ldots (N-1).$$

The (partial) beam strength is the eigenvalue: p-th DFT of row vector in $H_{m_1m_2}$.

The radial modes are from 0 to (M−1) for each of the azimuth modes. The beamforming vectors/eigenvectors and (complete) beam strength/eigenvalues are those from the intermediate matrix of Equation 14, where $h_{m_1m_2,p}$ is the p-th eigenvalue of the block matrix $H_{m_1m_2} e_p = h_{m_1m_2,p} e_p$.

The above procedures may be applicable regardless of any offsets between the multiple circles on the Tx plane or on the Tx plane, and regardless of any offsets between Tx antennas on a Tx circle and any corresponding Rx antennas on an Rx circle.

The following characteristics regarding the separability of the azimuth and radial modes may apply in some examples. The azimuth and radial modes might not be totally separated because the radial modes are different for each azimuth mode. The azimuth and radial modes may be partially separable: (mn)*(mn) matrix degenerates into a m*m matrix (circle-wise). The azimuth and radial modes may be sequentially separable: the azimuth modes are invariant, while the radial modes are dependent on the azimuth modes. The number of modes in each direction is independent, depending on the number of circles and elements in the circles. This is a consequence of circular symmetry. In some aspects, these characteristics may correspond to the separability in solving the partial deferential equations. In some aspects, this result may be an extension of a result for a block-circular matrix.

Figure 17:
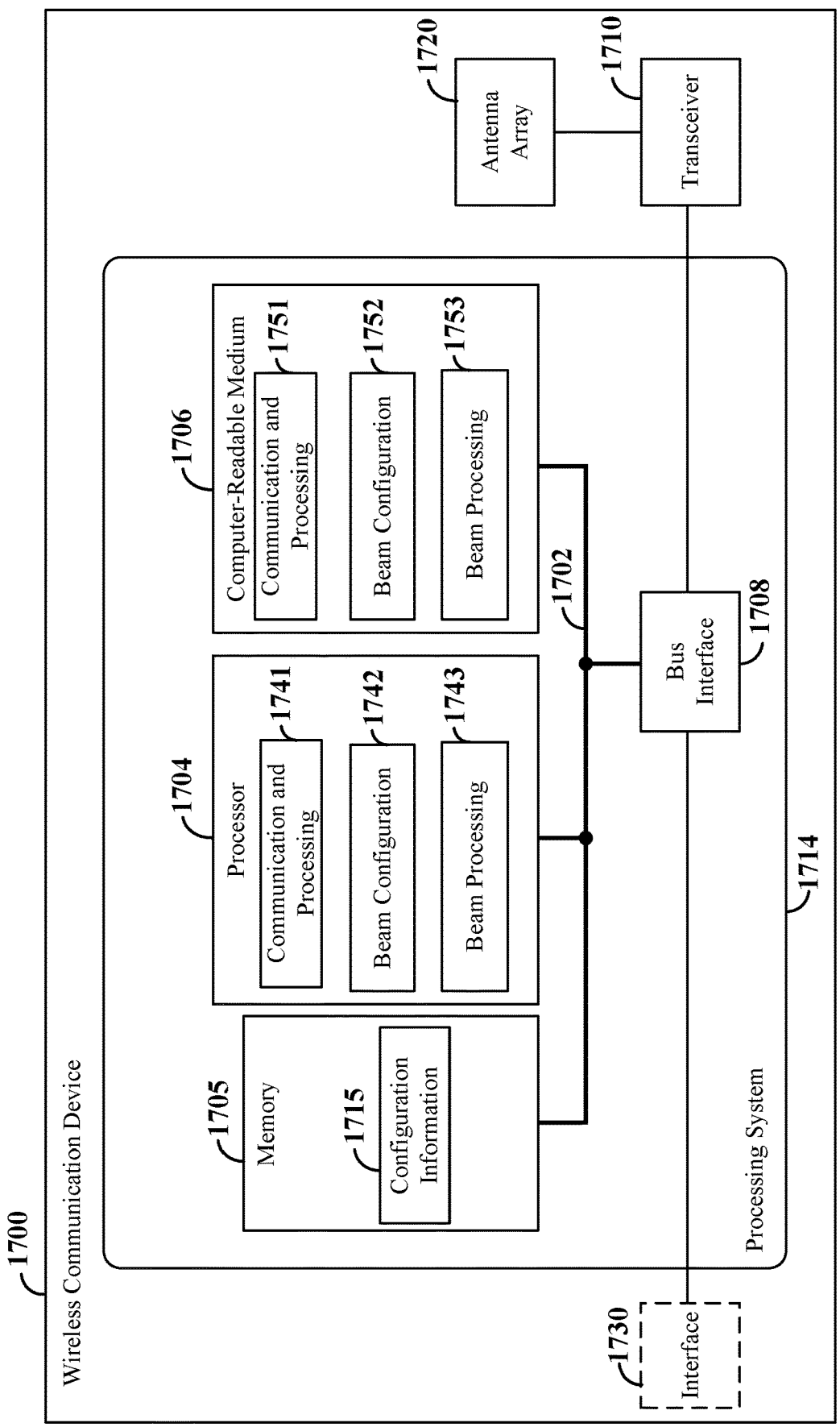
FIG. 17 is a block diagram illustrating an example of a hardware implementation for a wireless communication device employing a processing system according to some aspects.

FIG. 17 is a block diagram illustrating an example of a hardware implementation for a wireless communication device 1700 employing a processing system 1714. For example, the wireless communication device 1700 may be a device configured to wirelessly communicate with a base station, as discussed in any one or more of FIGS. 1-16. In some implementations, the wireless communication device 1700 may correspond to any of the base stations (e.g., gNBs), scheduling entities, distributed units, control units, RAN nodes, CN entities, UEs, or scheduled entities shown in any of FIGS. 1, 2, 4, and 5. In some implementations, the wireless communication device 1700 may include antenna circuitry as shown in any of FIGS. 5-16.

In accordance with various aspects of the disclosure, an element, or any portion of an element, or any combination of elements may be implemented with the processing system 1714. The processing system 1714 may include one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1700 may be configured to perform any one or more of the functions described herein. That is, the processor 1704, as utilized in a wireless communication device 1700, may be used to implement any one or more of the processes and procedures described herein.

In examples where the wireless communication device is a scheduled entity (e.g., a UE or a radio unit), the processor 1704 may in some instances be implemented via a baseband or modem chip and in other implementations, the processor 1704 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In examples where the wireless communication device is a scheduling entity (e.g., a base station or a control unit), the processor 1704 may be configured to generate, schedule, and modify a resource assignment or grant of time-frequency resources (e.g., a set of one or more resource elements). For example, the processor 1704 may schedule time-frequency resources within a plurality of time division duplex (TDD) and/or frequency division duplex (FDD) subframes, slots, and/or mini-slots to carry user data traffic and/or control information to and/or from multiple UEs. The processor 1704 may further be configured to schedule resources for the transmission of an uplink signal. The processor 1704 may be configured to schedule uplink resources that may be utilized by the UE to transmit an uplink message (e.g., a PUCCH, a PUSCH, a PRACH occasion, or an RRC message). In some examples, the processor 1704 may be configured to schedule uplink resources in response to receiving a scheduling request from the UE.

In the example of FIG. 17, the processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710 and between the bus 1702 and an interface 1730. The transceiver 1710 provides a communication interface or means for communicating with various other apparatus over a wireless transmission medium. In some examples, the UE may include at least one transceiver 1710 and at least one antenna array 1720. A transceiver 1710 may include at least one transmitter circuit and/or at least one receiver circuit (e.g., as discussed above in conjunction with FIGS. 5-8, 15, and 16). An antenna array 1720 may include at least one circular array antenna (e.g., as discussed above in conjunction with FIGS. 6, 7, and 9-16). The interface 1730 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1730 may include a user interface (e.g., keypad, display, speaker, microphone, joystick). Of course, such a user interface is optional, and may be omitted in some examples, such as an IoT device.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software. For example, the memory 1705 may store configuration information 1715 (e.g., antenna configuration information parameters and/or OAM information) used by the processor 1704 in cooperation with the transceiver 1710 for transmitting and/or receiving beamformed signals.

One or more processors 1704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 1700 may be configured to perform any one or more of the operations described herein (e.g., as described above in conjunction with FIGS. 1-16 and as described below in conjunction with FIGS. 18 and 19). In some aspects of the disclosure, the processor 1704, as utilized in the wireless communication device 1700, may include circuitry configured for various functions.

The processor 1704 may include communication and processing circuitry 1741. The communication and processing circuitry 1741 may be configured to communicate with another wireless communication device. The communication and processing circuitry 1741 may include one or more hardware components that provide the physical structure that performs various processes related to wireless communication (e.g., signal reception and/or signal transmission) as described herein. The communication and processing circuitry 1741 may further include one or more hardware components that provide the physical structure that performs various processes related to signal processing (e.g., processing a received signal and/or processing a signal for transmission) as described herein. In some examples, the communication and processing circuitry 1741 may include two or more transmit/receive chains. The communication and processing circuitry 1741 may further be configured to execute communication and processing software 1751 included on the computer-readable medium 1706 to implement one or more functions described herein.

The communication and processing circuitry 1741 may further be configured to control the antenna array 1720 and the transceiver 1710 to generate and transmit beamformed signals (e.g., at a mmWave frequency, etc.). Similarly, the communication and processing circuitry 1741 may further be configured to control the antenna array 1720 and the transceiver 1710 to receive and process beamformed signals.

In examples where the wireless communication device 1700 is a radio unit, the communication and processing circuitry 1741 may further be configured to communicate with a distributed unit via a first link (e.g., a fronthaul link) and a set of one or more child nodes (e.g., UEs) via respective second links (e.g., access links). In some examples, the communication and processing circuitry 1741 may further be configured to communicate with a child node via a fronthaul link.

In examples where the wireless communication device 1700 is a distributed unit, the communication and processing circuitry 1741 may be configured to communicate with a radio unit via a fronthaul link. In some implementations, the communication and processing circuitry 1741 may be configured to communicate with a parent node via one or more midhaul and/or backhaul links.

In some implementations where the communication involves receiving information, the communication and processing circuitry 1741 may obtain information from a component of the wireless communication device 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, other information, or any combination thereof. In some examples, the communication and processing circuitry 1741 may receive information via one or more channels. In some examples, the communication and processing circuitry 1741 may include functionality for a means for receiving. In some examples, the communication and processing circuitry 1741 may include functionality for a means for decoding.

In some implementations where the communication involves sending (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, other information, or any combination thereof. In some examples, the communication and processing circuitry 1741 may send information via one or more channels. In some examples, the communication and processing circuitry 1741 may include functionality for a means for sending (e.g., a means for transmitting). In some examples, the communication and processing circuitry 1741 may include functionality for a means for encoding.

The processor 1704 may include beam configuration circuitry 1742 configured to perform network beam configuration-related operations as discussed herein (e.g., one or more of the operations described in conjunction with FIGS. 6-16). The beam configuration circuitry 1742 may be configured to execute beam configuration software 1752 included on the computer-readable medium 1706 to implement one or more functions described herein.

The beam configuration circuitry 1742 may include functionality for a means for determining an angular offset. For example, the beam configuration circuitry 1742 may be configured to retrieve configuration information 1715 from the memory 1705 to determine an angular offset between the antenna elements associated with a first circle and the antenna elements associated with a second circle.

The beam configuration circuitry 1742 may include functionality for a means for generating signal weights. For example, the beam configuration circuitry 1742 may be configured to generate a first signal weight for a first antenna element based on an angle (e.g., relative to a defined reference radius) associated with the first antenna element, generate a second signal weight for a second antenna element based on an angle (e.g., relative to a defined reference radius) associated with the second antenna element, and so on. In some examples, the beam configuration circuitry 1742 may be configured to generate the weights $w_1$, $w_2$, etc., as discussed above.

The processor 1704 may include beam processing circuitry 1743 configured to perform beam processing-related operations as discussed herein (e.g., one or more of the operations described in conjunction with FIGS. 6-16). The beam processing circuitry 1743 may be configured to execute beam processing software 1753 included on the computer-readable medium 1706 to implement one or more functions described herein.

The beam processing circuitry 1743 may include functionality for a means for transmitting OAM signals. For example, the beam processing circuitry 1743 may be configured to cooperate with the communication and processing circuitry 1741 to transmit first OAM signals based on a reference angle. As another example, the beam processing circuitry 1743 may be configured to cooperate with the communication and processing circuitry 1741 to transmit second OAM signals based on at least one offset to the reference angle.

The beam processing circuitry 1743 may include functionality for a means for receiving OAM signals. For example, the beam processing circuitry 1743 may be configured to cooperate with the communication and processing circuitry 1741 to receive first OAM signals based on a reference angle. As another example, the beam processing circuitry 1743 may be configured to cooperate with the communication and processing circuitry 1741 to receive second OAM signals based on at least one offset to the reference angle.

The beam processing circuitry 1743 may include functionality for a means for processing OAM signals. In some examples, the beam processing circuitry 1743 may be configured to process first OAM signals for a first array of antenna elements according to a first OAM mode and process second OAM signals for a second array of antenna elements according to a second OAM mode. For example, the beam processing circuitry 1743 may decode signals received on the first array using a first phase rotation and/or a first polarization. In addition, the beam processing circuitry 1743 may decode signals received on the second array using a second phase rotation and/or a second polarization.

The beam processing circuitry 1743 may include functionality for a means for demultiplexing data streams. For example, the beam processing circuitry 1743 may be configured to derive a first data stream from first OAM signals received via a first array of antenna elements according to a first OAM mode and derive a second data stream from second OAM signals received via a second array of antenna elements according to a second OAM mode.

In some examples, the wireless communication device 1700 shown and described above in connection with FIG. 17 may be a disaggregated base station. For example, the wireless communication device 1700 (e.g., a network entity) may include the CU and optionally one or more DUs/RUs of the disaggregated base station. Other DUs/RUs associated with the wireless communication device 1700 may be distributed throughout the network. In some examples, the DUs/RUs may correspond to TRPs associated with the network entity. In some examples, the CU and/or DU/RU of the disaggregated base station (e.g., within the wireless communication device 1700) may generate determine weights, generate signals for OAM transmissions, and/or process received OAM transmissions.

Figure 18:
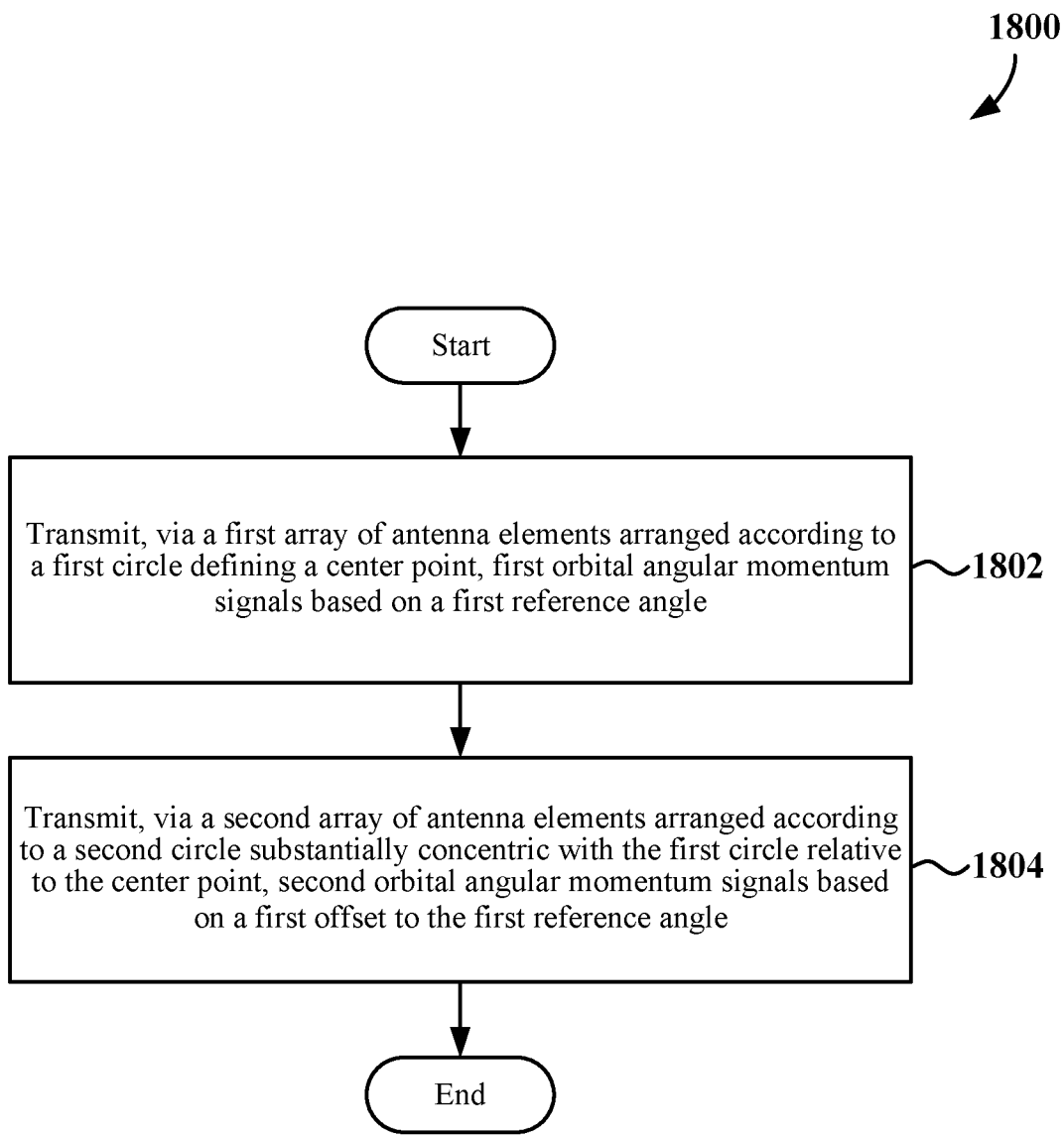
FIG. 18 is a flow chart illustrating an example method for transmitting signals using an antenna array with offset antenna circles according to some aspects.

FIG. 18 is a flow chart illustrating an example method 1800 for wireless communication according to some aspects of the disclosure. As described herein, some or all illustrated features may be omitted in a particular implementation within the scope of the present disclosure, and some illustrated features may not be required for implementation of all examples. In some examples, the method 1800 may be carried out by the wireless communication device 1700 illustrated in FIG. 17. In some examples, the method 1800 may be carried out by any suitable apparatus or means for carrying out the functions or algorithm described below.

At block 1802, a wireless communication device may transmit, via a first array of antenna elements arranged according to a first circle defining a center point, first orbital angular momentum signals based on a first reference angle. For example, the beam processing circuitry 1743 together with the communication and processing circuitry 1741 and the transceiver 1710, shown and described above in connection with FIG. 17, may provide a means to transmit, via a first array of antenna elements arranged according to a first circle defining a center point, first orbital angular momentum signals based on a first reference angle.

At block 1804, the wireless communication device may transmit, via a second array of antenna elements arranged according to a second circle substantially concentric with the first circle relative to the center point, second orbital angular momentum signals based on a first offset to the first reference angle. For example, the beam processing circuitry 1743 together with the communication and processing circuitry 1741 and the transceiver 1710, shown and described above in connection with FIG. 17, may provide a means to transmit, via a second array of antenna elements arranged according to a second circle substantially concentric with the first circle relative to the center point, second orbital angular momentum signals based on a first offset to the first reference angle.

In some examples, the first array of antenna elements may include a first antenna element defining a first radius from the center point. In some examples, the second array of antenna elements may include a second antenna element defining a second radius from the center point. In some examples, the second radius is offset by a first angle with respect to the first radius. In some examples, the first angle corresponds to the first offset.

In some examples, respective antenna elements of the first array of antenna elements are arranged at substantially equal (e.g., within ±5%) first distances along the first circle. In some examples, respective antenna elements of the second array of antenna elements are arranged at substantially equal (e.g., within ±5%) second distances along the second circle.

In some examples, a reference wavelength is associated with the first orbital angular momentum signals. In some examples, a closest distance between any antenna element of the first array of antenna elements and any antenna element of the second array of antenna elements is at least half the reference wavelength.

In some examples, the wireless communication device may generate a first set of signal weights for the first orbital angular momentum signals based on a plurality of angles associated with the first array of antenna elements. In some examples, the wireless communication device may generate a second set of signal weights for the second orbital angular momentum signals based on a plurality of angles associated with the second array of antenna elements.

In some examples, the wireless communication device may multiplex a first data stream onto the first orbital angular momentum signals according to a first signal amplitude. In some examples, the wireless communication device may multiplex a second data stream onto the second orbital angular momentum signals according to a second signal amplitude that is different from the first signal amplitude.

In some examples, the wireless communication device may multiplex a first data stream onto the first orbital angular momentum signals according to a first orbital angular momentum mode. In some examples, the wireless communication device may multiplex a second data stream onto the second orbital angular momentum signals according to a second orbital angular momentum mode that is different from the first orbital angular momentum mode.

In some examples, the transceiver may include a first transmitter configured to transmit the first orbital angular momentum signals via the first array of antenna elements. In some examples, the transceiver may include a second transmitter configured to transmit the second orbital angular momentum signals via the second array of antenna elements.

In some examples, the first orbital angular momentum signals and the second orbital angular momentum signals may include coaxially propagating, spatially overlapping waves.

Figure 19:
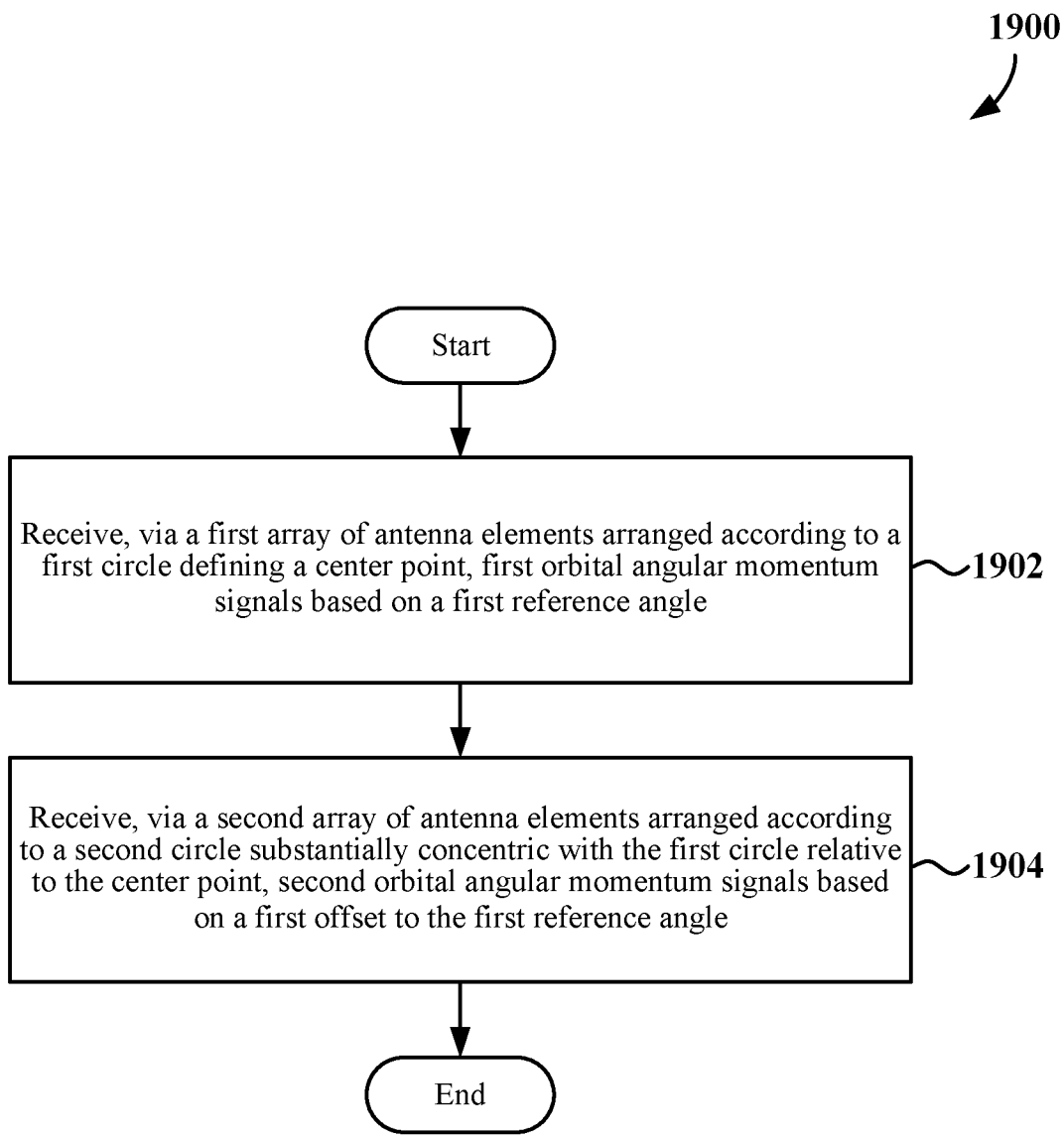
FIG. 19 is a flow chart illustrating an example method for receiving signals using an antenna array with offset antenna circles according to some aspects.

FIG. 19 is a flow chart illustrating an example method 1900 for wireless communication according to some aspects of the disclosure. As described herein, some or all illustrated features may be omitted in a particular implementation within the scope of the present disclosure, and some illustrated features may not be required for implementation of all examples. In some examples, the method 1900 may be carried out by the wireless communication device 1700 illustrated in FIG. 17. In some examples, the method 1900 may be carried out by any suitable apparatus or means for carrying out the functions or algorithm described below.

At block 1902, a wireless communication device may receive, via a first array of antenna elements arranged according to a first circle defining a center point, first orbital angular momentum signals based on a first reference angle. For example, the beam configuration circuitry 1742 together with the communication and processing circuitry 1741 and the transceiver 1710, shown and described above in connection with FIG. 17, may provide a means to receive, via a first array of antenna elements arranged according to a first circle defining a center point, first orbital angular momentum signals based on a first reference angle.

At block 1904, the wireless communication device may receive, via a second array of antenna elements arranged according to a second circle substantially concentric with the first circle relative to the center point, second orbital angular momentum signals based on a first offset to the first reference angle. For example, the beam processing circuitry 1743 together with the communication and processing circuitry 1741 and the transceiver 1710, shown and described above in connection with FIG. 17, may provide a means to receive, via a second array of antenna elements arranged according to a second circle substantially concentric with the first circle relative to the center point, second orbital angular momentum signals based on a first offset to the first reference angle.

In some examples, the first array of antenna elements may include a first antenna element defining a first radius from the center point. In some examples, the second array of antenna elements may include a second antenna element defining a second radius from the center point. In some examples, the second radius is offset by a first angle with respect to the first radius. In some examples, the first angle corresponds to the first offset.

In some examples, respective antenna elements of the first array of antenna elements are arranged at substantially equal first distances along the first circle. In some examples, respective antenna elements of the second array of antenna elements are arranged at substantially equal second distances along the second circle.

In some examples, a reference wavelength is associated with the first orbital angular momentum signals. In some examples, a closest distance between any antenna element of the first array of antenna elements and any antenna element of the second array of antenna elements is at least half the reference wavelength.

In some examples, the wireless communication device may generate a first set of signal weights for the first orbital angular momentum signals based on a plurality of angles associated with the first array of antenna elements. In some examples, the wireless communication device may generate a second set of signal weights for the second orbital angular momentum signals based on a plurality of angles associated with the second array of antenna elements.

In some examples, the wireless communication device may demultiplex a first data stream from the first orbital angular momentum signals according to a first signal amplitude. In some examples, the wireless communication device may demultiplex a second data stream from the second orbital angular momentum signals according to a second signal amplitude that is different from the first signal amplitude.

In some examples, the wireless communication device may demultiplex a first data stream from the first orbital angular momentum signals according to a first orbital angular momentum mode. In some examples, the wireless communication device may demultiplex a second data stream from the second orbital angular momentum signals according to a second orbital angular momentum mode that is different from the first orbital angular momentum mode.

In some examples, the transceiver may include a first receiver configured to receive the first orbital angular momentum signals via the first array of antenna elements. In some examples, the transceiver may include a second receiver configured to receive the second orbital angular momentum signals via the second array of antenna elements.

In some examples, the first orbital angular momentum signals and the second orbital angular momentum signals may include coaxially propagating, spatially overlapping waves.

In one configuration, the wireless communication device 1700 includes means for transmitting, via a first array of antenna elements arranged according to a first circle defining a center point, first orbital angular momentum signals based on a first reference angle, and means for transmitting, via a second array of antenna elements arranged according to a second circle substantially concentric with the first circle relative to the center point, second orbital angular momentum signals based on a first offset to the first reference angle. In one configuration, the wireless communication device 1700 includes means for receiving, via a first array of antenna elements arranged according to a first circle defining a center point, first orbital angular momentum signals based on a first reference angle, and means for receiving, via a second array of antenna elements arranged according to a second circle substantially concentric with the first circle relative to the center point, second orbital angular momentum signals based on a first offset to the first reference angle. In one aspect, the aforementioned means may be the processor 1704 shown in FIG. 17 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable medium 1706, or any other suitable apparatus or means described in any one or more of FIGS. 1, 2, 4-8, and 15-17 and utilizing, for example, the methods and/or algorithms described herein in relation to FIGS. 18-19.

The methods shown in FIG. 18-19 may include additional aspects, such as any single aspect or any combination of aspects described below and/or in connection with one or more other processes described elsewhere herein. The following provides an overview of several aspects of the present disclosure.

Aspect 1: An array antenna, comprising: a first array of antenna elements arranged at substantially equal first distances along a first circle defining a center point, the first array of antenna elements comprising a first antenna element defining a first radius from the center point; and a second array of antenna elements arranged at substantially equal second distances along a second circle that is substantially concentric with the first circle relative to the center point, the second array of antenna elements comprising a second antenna element defining a second radius from the center point, the second radius being offset at a first angle with respect to the first radius.

Aspect 2: The array antenna of aspect 1, wherein: a reference wavelength is associated with a reference frequency of a signal to be transmitted or received via the antenna array; and a closest distance between any antenna element of the first array of antenna elements and any antenna element of the second array of antenna elements is at least half the reference wavelength.

Aspect 3: The array antenna of aspect 1 or 2, further comprising: a third array of antenna elements arranged at substantially equal third distances along a third circle that is substantially concentric with the first circle relative to the center point, the third array of antenna elements comprising a third antenna element defining a third radius from the center point, the third radius being offset at a second angle with respect to the first radius.

Aspect 4: The array antenna of aspect 3, wherein: a reference wavelength is associated with a reference frequency of a signal to be transmitted or received via the antenna array; and a closest distance between any antenna element of the first array of antenna elements and any antenna element of the third array of antenna elements is at least half the reference wavelength.

Aspect 5: The array antenna of any of aspects 1 through 2, further comprising: a third array of antenna elements arranged according to a third circle substantially concentric with the first circle relative to the center point, the third array of antenna elements comprising a third antenna element along the first radius, the third circle having a size that is smaller than the first circle and the second circle, the second circle having a size that is smaller than the first circle.

Aspect 6: The array antenna of aspect 5, wherein: a reference wavelength is associated with a reference frequency of a signal to be transmitted or received via the antenna array; and a closest distance between the first antenna element and the third antenna element is at least half the reference wavelength.

Aspect 7: The array antenna of any of aspects 1 through 6, wherein at least one antenna element of the first array of antenna elements and the second array of antenna elements comprises a subarray of antenna elements.

Aspect 8: The array antenna of any of aspects 1 through 7, further comprising a transmitter circuit configured to: transmit first orbital angular momentum signals via the first array of antenna elements based on a reference angle associated with the first radius; and transmit second orbital angular momentum signals via the second array of antenna elements based on the first angle.

Aspect 9: The array antenna of aspect 8, wherein the transmitter circuit is further configured to: generate a first set of signal weights for the first orbital angular momentum signals based on a plurality of angles associated with the first array of antenna elements; and generate a second set of signal weights for the second orbital angular momentum signals based on a plurality of angles associated with the second array of antenna elements.

Aspect 10: The array antenna of any of aspects 1 through 7, further comprising a receiver circuit configured to: receive first orbital angular momentum signals via the first array of antenna elements based on a reference angle associated with the first radius; and receive second orbital angular momentum signals via the second array of antenna elements based on the first angle.

Aspect 11: The array antenna of aspect 10, wherein the receiver circuit is further configured to: generate a first set of signal weights for the first orbital angular momentum signals based on a plurality of angles associated with the first array of antenna elements; and generate a second set of signal weights for the second orbital angular momentum signals based on a plurality of angles associated with the second array of antenna elements.

Aspect 12: The array antenna of any of aspects 1 through 7, further comprising: a first transmitter circuit configured to transmit first orbital angular momentum signals via the first array of antenna elements based on a reference angle associated with the first radius; and a second transmitter circuit configured to transmit second orbital angular momentum signals via the second array of antenna elements based on the first angle.

Aspect 13: The array antenna of aspect 12, wherein: the first transmitter circuit is further configured to generate a first set of signal weights for the first orbital angular momentum signals based on a plurality of angles associated with the first array of antenna elements; and the second transmitter circuit is further configured to generate a second set of signal weights for the second orbital angular momentum signals based on a plurality of angles associated with the second array of antenna elements.

Aspect 14: The array antenna of any of aspects 1 through 7, further comprising: a first receiver circuit configured to receive first orbital angular momentum signals via the first array of antenna elements based on a reference angle associated with the first radius; and a second receiver circuit configured to receive second orbital angular momentum signals via the second array of antenna elements based on the first angle.

Aspect 15: The array antenna of aspect 14, wherein: the first receiver circuit is further configured to generate a first set of signal weights for the first orbital angular momentum signals based on a plurality of angles associated with the first array of antenna elements; and the second receiver circuit is further configured to generate a second set of signal weights for the second orbital angular momentum signals based on a plurality of angles associated with the second array of antenna elements.

Aspect 16: The array antenna of any of aspects 1 through 15, further comprising at least one transceiver circuit configured to: process first orbital angular momentum signals for the first array of antenna elements according to a first orbital angular momentum mode; and process second orbital angular momentum signals for the second array of antenna elements according to a second orbital angular momentum mode that is different from the first orbital angular momentum mode.

Aspect 17: An antenna system, comprising: a first antenna comprising a first array of antenna elements arranged at substantially equal first distances along a first circle defining a first center point, the first array of antenna elements comprising a first antenna element defining a first radius from the first center point, the first antenna further comprising a second array of antenna elements arranged at substantially equal second distances along a second circle that is substantially concentric with the first circle relative to the first center point, the second array of antenna elements comprising a second antenna element defining a second radius from the first center point, the second radius being offset at a first angle with respect to the first radius; and a second antenna comprising a third array of antenna elements arranged at substantially equal third distances along a third circle defining a second center point, the third array of antenna elements comprising a third antenna element defining a third radius from the second center point, the second antenna further comprising a fourth array of antenna elements arranged at substantially equal fourth distances along a fourth circle that is substantially concentric with the third circle relative to the second center point, the fourth array of antenna elements comprising a fourth antenna element defining a fourth radius from the second center point, the fourth radius being offset at a second angle with respect to the third radius, the third radius being offset at a third angle with respect to the first radius.

Aspect 18: The antenna system of aspect 17, further comprising: a transmitter coupled to the first antenna; and a receiver coupled to the second antenna.

Aspect 19: The antenna system of any of aspects 17 through 18, wherein the first angle is substantially equal to the second angle.

Aspect 20: The antenna system of any of aspects 17 through 19, wherein: a reference wavelength is associated with a reference frequency of a signal to be transmitted or received via the first antenna; a closest distance between any antenna element of the first array of antenna elements and any antenna element of the second array of antenna elements is at least half the reference wavelength; and a closest distance between any antenna element of the third array of antenna elements and any antenna element of the fourth array of antenna elements is at least half the reference wavelength.

Aspect 21: A wireless communication device, comprising: an antenna array comprising a first array of antenna elements arranged according to a first circle defining a center point, and further comprising a second array of antenna elements arranged according to a second circle substantially concentric with the first circle relative to the center point; a transceiver coupled to the antenna array; a memory; and a processor coupled to the transceiver and the memory, wherein the processor and the memory are configured to: transmit, via the transceiver and the first array of antenna elements, first orbital angular momentum signals based on a first reference angle, and transmit, via the transceiver and the second array of antenna elements, second orbital angular momentum signals based on a first offset to the first reference angle.

Aspect 22: The wireless communication device of aspect 21, wherein: the first array of antenna elements comprises a first antenna element defining a first radius from the center point; the second array of antenna elements comprises a second antenna element defining a second radius from the center point; the second radius is offset by a first angle with respect to the first radius; and the first angle corresponds to the first offset.

Aspect 23: The wireless communication device of aspect 22, wherein: the antenna element of the first array of antenna elements are arranged at substantially equal first distances along the first circle; and respective antenna elements of the second array of antenna elements are arranged at substantially equal second distances along the second circle.

Aspect 24: The wireless communication device of any of aspects 21 through 23, wherein: a reference wavelength is associated with the first orbital angular momentum signals; and a closest distance between any antenna element of the first array of antenna elements and any antenna element of the second array of antenna elements is at least half the reference wavelength.

Aspect 25: The wireless communication device of any of aspects 21 through 24, wherein the processor and the memory are further configured to: generate a first set of signal weights for the first orbital angular momentum signals based on a plurality of angles associated with the first array of antenna elements; and generate a second set of signal weights for the second orbital angular momentum signals based on a plurality of angles associated with the second array of antenna elements.

Aspect 26: The wireless communication device of any of aspects 21 through 25, wherein the processor and the memory are further configured to: multiplex a first data stream onto the first orbital angular momentum signals according to a first signal amplitude; and multiplex a second data stream onto the second orbital angular momentum signals according to a second signal amplitude that is different from the first signal amplitude.

Aspect 27: The wireless communication device of any of aspects 21 through 26, wherein the processor and the memory are further configured to: multiplex a first data stream onto the first orbital angular momentum signals according to a first orbital angular momentum mode; and multiplex a second data stream onto the second orbital angular momentum signals according to a second orbital angular momentum mode that is different from the first orbital angular momentum mode.

Aspect 28: The wireless communication device of any of aspects 21 through 27, wherein the transceiver comprises: a first transmitter configured to transmit the first orbital angular momentum signals via the first array of antenna elements; and a second transmitter configured to transmit the second orbital angular momentum signals via the second array of antenna elements.

Aspect 29: The wireless communication device of any of aspects 21 through 28, wherein the first orbital angular momentum signals and the second orbital angular momentum signals comprise coaxially propagating, spatially overlapping waves.

Aspect 30: A method for wireless communication at a wireless communication device, the method comprising: transmitting, via a first array of antenna elements arranged according to a first circle defining a center point, first orbital angular momentum signals based on a first reference angle; and transmitting, via a second array of antenna elements arranged according to a second circle substantially concentric with the first circle relative to the center point, second orbital angular momentum signals based on a first offset to the first reference angle.

Aspect 31: A wireless communication device, comprising: an antenna array comprising a first array of antenna elements arranged according to a first circle defining a center point, and further comprising a second array of antenna elements arranged according to a second circle substantially concentric with the first circle relative to the center point; a transceiver coupled to the antenna array; a memory; and a processor coupled to the transceiver and the memory, wherein the processor and the memory are configured to: receive, via the transceiver and the first array of antenna elements, first orbital angular momentum signals based on a first reference angle, and receive, via the transceiver and the second array of antenna elements, second orbital angular momentum signals based on a first offset to the first reference angle.

Aspect 32: The wireless communication device of aspect 31, wherein: the first array of antenna elements comprises a first antenna element defining a first radius from the center point; the second array of antenna elements comprises a second antenna element defining a second radius from the center point; the second radius is offset by a first angle with respect to the first radius; and the first angle corresponds to the first offset.

Aspect 33: The wireless communication device of aspect 32, wherein: respective antenna elements of the first array of antenna elements are arranged at substantially equal first distances along the first circle; and respective antenna elements of the second array of antenna elements are arranged at substantially equal second distances along the second circle.

Aspect 34: The wireless communication device of any of aspects 31 through 32, wherein: a reference wavelength is associated with the first orbital angular momentum signals; and a closest distance between any antenna element of the first array of antenna elements and any antenna element of the second array of antenna elements is at least half the reference wavelength.

Aspect 35: The wireless communication device of any of aspects 31 through 34, wherein the processor and the memory are further configured to: generate a first set of signal weights for the first orbital angular momentum signals based on a plurality of angles associated with the first array of antenna elements; and generate a second set of signal weights for the second orbital angular momentum signals based on a plurality of angles associated with the second array of antenna elements.

Aspect 36: The wireless communication device of any of aspects 31 through 35, wherein the processor and the memory are further configured to: demultiplex a first data stream from the first orbital angular momentum signals according to a first signal amplitude; and demultiplex a second data stream from the second orbital angular momentum signals according to a second signal amplitude that is different from the first signal amplitude.

Aspect 37: The wireless communication device of any of aspects 31 through 36, wherein the processor and the memory are further configured to: demultiplex a first data stream from the first orbital angular momentum signals according to a first orbital angular momentum mode; and demultiplex a second data stream from the second orbital angular momentum signals according to a second orbital angular momentum mode that is different from the first orbital angular momentum mode.

Aspect 38: The wireless communication device of any of aspects 31 through 37, wherein the transceiver comprises: a first receiver configured to receive the first orbital angular momentum signals via the first array of antenna elements; and a second receiver configured to receive the second orbital angular momentum signals via the second array of antenna elements.

Aspect 39: The wireless communication device of any of aspects 31 through 38, wherein the first orbital angular momentum signals and the second orbital angular momentum signals comprise coaxially propagating, spatially overlapping waves.

Aspect 40: A method for wireless communication at a wireless communication device, the method comprising: receiving, via a first array of antenna elements arranged according to a first circle defining a center point, first orbital angular momentum signals based on a first reference angle; and receiving, via a second array of antenna elements arranged according to a second circle substantially concentric with the first circle relative to the center point, second orbital angular momentum signals based on a first offset to the first reference angle.

Aspect 41: A wireless communication device comprising: a transceiver, a memory, and a processor coupled to the transceiver and the memory, wherein the processor and the memory are configured to perform any one of aspects 21 through 30.

Aspect 42: An apparatus configured for wireless communication comprising at least one means for performing any one of aspects 21 through 30.

Aspect 43: A non-transitory computer-readable medium storing computer-executable code, comprising code for causing an apparatus to perform any one of aspects 21 through 30.

Aspect 44: A wireless communication device comprising: a transceiver, a memory, and a processor coupled to the transceiver and the memory, wherein the processor and the memory are configured to perform any one of aspects 31 through 40.

Aspect 45: An apparatus configured for wireless communication comprising at least one means for performing any one of aspects 31 through 40.

Aspect 46: A non-transitory computer-readable medium storing computer-executable code, comprising code for causing an apparatus to perform any one of aspects 31 through 40.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1, 2, 4-8, and 15-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An array antenna, comprising:
a first circular array of antenna elements arranged at substantially equal first distances along a first circle of a first size defining a center point, the first circular array of antenna elements consisting of a first number of antenna elements, the first circular array of antenna elements comprising a first antenna element defining a first radius from the center point;
a second circular array of antenna elements arranged at substantially equal second distances along a second circle of a second size that is adjacent to the first circle and substantially concentric with the first circle relative to the center point, the second circular array of antenna elements consisting of the first number of antenna elements, the second circular array of antenna elements comprising a second antenna element defining a second radius from the center point, the second radius being offset at a first angle with respect to the first radius, a reference wavelength being associated with a reference frequency of a signal to be transmitted or received via the antenna array, and a first minimum distance between the first antenna element of the first circular array of antenna elements and any antenna element of the second circular array of antenna elements that is closest to the first antenna element being at least half the reference wavelength, the second size of the second circle being smaller than the first size of the first circle; and
a third circular array of antenna elements arranged at substantially equal third distances along a third circle of a third size that is substantially concentric with the first circle relative to the center point, the third circular array of antenna elements consisting of the first number of antenna elements, the third circular array of antenna elements comprising a third antenna element along the first radius, the third size of the third circle being smaller than the second size of the second circle.

2. The antenna array of claim 1, wherein:
a second minimum distance between the first antenna element of the first circular array of antenna elements and any antenna element of the third circular array of antenna elements that is closest to the first antenna element is at least half the reference wavelength.

3. The antenna array of claim 1, wherein:
a second minimum distance between the second antenna element of the second circular array of antenna elements and any antenna element of the third circular array of antenna elements that is closest to the second antenna element is at least half the reference wavelength.

4. The antenna array of claim 1, wherein at least one antenna element of the first circular array of antenna elements and the second circular array of antenna elements comprises a subarray of antenna elements.

5. The antenna array of claim 1, further comprising a transmitter circuit configured to:
transmit first orbital angular momentum signals via the first circular array of antenna elements based on a reference angle associated with the first radius; and
transmit second orbital angular momentum signals via the second circular array of antenna elements based on the first angle.

6. The antenna array of claim 5, wherein the transmitter circuit is further configured to:
generate a first set of signal weights for the first orbital angular momentum signals based on a first plurality of angles associated with the first circular array of antenna elements; and
generate a second set of signal weights for the second orbital angular momentum signals based on a second plurality of angles associated with the second circular array of antenna elements.

7. The antenna array of claim 1, further comprising a receiver circuit configured to:
receive first orbital angular momentum signals via the first circular array of antenna elements based on a reference angle associated with the first radius; and
receive second orbital angular momentum signals via the second circular array of antenna elements based on the first angle.

8. The antenna array of claim 7, wherein the receiver circuit is further configured to:
generate a first set of signal weights for the first orbital angular momentum signals based on a first plurality of angles associated with the first circular array of antenna elements; and
generate a second set of signal weights for the second orbital angular momentum signals based on a second plurality of angles associated with the second circular array of antenna elements.

9. The antenna array of claim 1, further comprising:
a first transmitter circuit configured to transmit first orbital angular momentum signals via the first circular array of antenna elements based on a reference angle associated with the first radius; and
a second transmitter circuit configured to transmit second orbital angular momentum signals via the second circular array of antenna elements based on the first angle.

10. The antenna array of claim 9, wherein:
the first transmitter circuit is further configured to generate a first set of signal weights for the first orbital angular momentum signals based on a first plurality of angles associated with the first circular array of antenna elements; and
the second transmitter circuit is further configured to generate a second set of signal weights for the second orbital angular momentum signals based on a second plurality of angles associated with the second circular array of antenna elements.

11. The antenna array of claim 1, further comprising:
a first receiver circuit configured to receive first orbital angular momentum signals via the first circular array of antenna elements based on a reference angle associated with the first radius; and
a second receiver circuit configured to receive second orbital angular momentum signals via the second circular array of antenna elements based on the first angle.

12. The antenna array of claim 11, wherein:
the first receiver circuit is further configured to generate a first set of signal weights for the first orbital angular momentum signals based on a first plurality of angles associated with the first circular array of antenna elements; and
the second receiver circuit is further configured to generate a second set of signal weights for the second orbital angular momentum signals based on a second plurality of angles associated with the second circular array of antenna elements.

13. The antenna array of claim 1, further comprising at least one transceiver circuit configured to:
process first orbital angular momentum signals for the first circular array of antenna elements according to a first orbital angular momentum mode; and
process second orbital angular momentum signals for the second circular array of antenna elements according to a second orbital angular momentum mode that is different from the first orbital angular momentum mode.

14. A wireless communication device, comprising:
an antenna array comprising a first circular array of antenna elements arranged according to a first circle of a first size defining a center point, the first circular array of antenna elements consisting of a first number of antenna elements, the first circular array of antenna elements comprising a first antenna element defining a first radius from the center point,
the antenna array further comprising a second circular array of antenna elements arranged according to a second circle of a second size that is adjacent to the first circle and substantially concentric with the first circle relative to the center point, the second circular array of antenna elements consisting of the first number of antenna elements, the second circular array of antenna elements comprising a second antenna element defining a second radius from the center point, the second radius being offset at a first angle with respect to the first radius, a reference wavelength being associated with a reference frequency of first orbital angular momentum signals or second orbital angular momentum signals, and a minimum distance between the first antenna element of the first circular array of antenna elements and any antenna element of the second circular array of antenna elements that is closest to the first antenna element being at least half the reference wavelength, the second size of the second circle being smaller than the first size of the first circle,
the antenna array further comprising a third circular array of antenna elements arranged at substantially equal third distances along a third circle of a third size that is substantially concentric with the first circle relative to the center point, the third circular array of antenna elements consisting of the first number of antenna elements, the third circular array of antenna elements comprising a third antenna element along the first radius, the third size of the third circle being smaller than the second size of the second circle;
a transceiver coupled to the antenna array;
one or more memories that store processor-executable code; and
one or more processors configured to execute the processor-executable code and cause the wireless communication device to:
transmit, via the transceiver and the first circular array of antenna elements, the first orbital angular momentum signals based on a first reference angle,
transmit, via the transceiver and the second circular array of antenna elements, the second orbital angular momentum signals based on a first offset to the first reference angle,
the first offset corresponding to the first angle with respect to the first radius, and
transmit, via the transceiver and the third circular array of antenna elements, third orbital angular momentum signals based on the first reference angle.

15. The wireless communication device of claim 14, wherein:
respective antenna elements of the first circular array of antenna elements are arranged at substantially equal first distances along the first circle; and
respective antenna elements of the second circular array of antenna elements are arranged at substantially equal second distances along the second circle.

16. The wireless communication device of claim 14, wherein the one or more processors are further configured to execute the processor-executable code and cause the wireless communication device to:
generate a first set of signal weights for the first orbital angular momentum signals based on a first plurality of angles associated with the first circular array of antenna elements; and
generate a second set of signal weights for the second orbital angular momentum signals based on a second plurality of angles associated with the second circular array of antenna elements.

17. The wireless communication device of claim 14, wherein the one or more processors are further configured to execute the processor-executable code and cause the wireless communication device to:
multiplex a first data stream onto the first orbital angular momentum signals according to a first signal amplitude; and
multiplex a second data stream onto the second orbital angular momentum signals according to a second signal amplitude that is different from the first signal amplitude.

18. The wireless communication device of claim 14, wherein the one or more processors are further configured to execute the processor-executable code and cause the wireless communication device to:
multiplex a first data stream onto the first orbital angular momentum signals according to a first orbital angular momentum mode; and
multiplex a second data stream onto the second orbital angular momentum signals according to a second orbital angular momentum mode that is different from the first orbital angular momentum mode.

19. The wireless communication device of claim 14, wherein the transceiver comprises:
a first transmitter configured to transmit the first orbital angular momentum signals via the first circular array of antenna elements; and
a second transmitter configured to transmit the second orbital angular momentum signals via the second circular array of antenna elements.

20. The wireless communication device of claim 14, wherein the first orbital angular momentum signals and the second orbital angular momentum signals comprise coaxially propagating, spatially overlapping waves.

21. A method for wireless communication at a wireless communication device, the method comprising:
transmitting, via a first circular array of antenna elements arranged according to a first circle of a first size defining a center point, first orbital angular momentum signals based on a first reference angle;
transmitting, via a second circular array of antenna elements arranged according to a second circle of a second size smaller than the first size that is adjacent to the first circle and substantially concentric with the first circle relative to the center point, second orbital angular momentum signals based on a first offset to the first reference angle; and
transmitting, via a third circular array of antenna elements arranged according to a third circle of a third size smaller than the second size, third orbital angular momentum signals based on the first reference angle,
a reference wavelength being associated with a reference frequency of the first orbital angular momentum signals or the second orbital angular momentum signals, and a first minimum distance between a first antenna element of the first circular array of antenna elements and any antenna element of the second circular array of antenna elements that is closest to the first antenna element being at least half the reference wavelength, and a second minimum distance between a second antenna element of the second circular array of antenna elements and any antenna element of the third circular array of antenna elements that is closest to the second antenna element being at least half the reference wavelength.

22. A wireless communication device, comprising:
an antenna array comprising a first circular array of antenna elements arranged according to a first circle of a first size defining a center point, the first circular array of antenna elements consisting of a first number of antenna elements, the first circular array of antenna elements comprising a first antenna element defining a first radius from the center point,
the antenna array further comprising a second circular array of antenna elements arranged according to a second circle of a second size that is adjacent to the first circle and substantially concentric with the first circle relative to the center point, the second circular array of antenna elements consisting of the first number of antenna elements, the second circular array of antenna elements comprising a second antenna element defining a second radius from the center point, the second radius being offset at a first angle with respect to the first radius, a reference wavelength being associated with a reference frequency of first orbital angular momentum signals or second orbital angular momentum signals, and a minimum distance between the first antenna element of the first circular array of antenna elements and any antenna element of the second circular array of antenna elements that is closest to the first antenna element being at least half the reference wavelength, the second size of the second circle being smaller than the first size of the first circle, the antenna array further comprising a third circular array of antenna elements arranged at substantially equal third distances along a third circle of a third size that is substantially concentric with the first circle relative to the center point, the third circular array of antenna elements consisting of the first number of antenna elements, the third circular array of antenna elements comprising a third antenna element along the first radius, the third size of the third circle being smaller than the second size of the second circle;

a transceiver coupled to the antenna array;

one or more memories that store processor-executable code; and one or more processors configured to execute the processor-executable code and cause the wireless communication device to:
- receive, via the transceiver and the first circular array of antenna elements, the first orbital angular momentum signals based on a first reference angle,
- receive, via the transceiver and the second circular array of antenna elements, the second orbital angular momentum signals based on a first offset to the first reference angle, the first offset corresponding to the first angle with respect to the first radius, and
- receive, via the transceiver and the third circular array of antenna elements, third orbital angular momentum signals based on the first reference angle.

23. The wireless communication device of claim 22, wherein:
- respective antenna elements of the first circular array of antenna elements are arranged at substantially equal first distances along the first circle; and
- respective antenna elements of the second circular array of antenna elements are arranged at substantially equal second distances along the second circle.

24. The wireless communication device of claim 22, wherein the one or more processors are further configured to execute the processor-executable code and cause the wireless communication device to:
- generate a first set of signal weights for the first orbital angular momentum signals based on a first plurality of angles associated with the first circular array of antenna elements; and
- generate a second set of signal weights for the second orbital angular momentum signals based on a second plurality of angles associated with the second circular array of antenna elements.

25. The wireless communication device of claim 22, wherein the one or more processors are further configured to execute the processor-executable code and cause the wireless communication device to:
- demultiplex a first data stream from the first orbital angular momentum signals according to a first signal amplitude; and
- demultiplex a second data stream from the second orbital angular momentum signals according to a second signal amplitude that is different from the first signal amplitude.

26. The wireless communication device of claim 22, wherein the one or more processors are further configured to execute the processor-executable code and cause the wireless communication device to:
- demultiplex a first data stream from the first orbital angular momentum signals according to a first orbital angular momentum mode; and
- demultiplex a second data stream from the second orbital angular momentum signals according to a second orbital angular momentum mode that is different from the first orbital angular momentum mode.

27. The wireless communication device of claim 22, wherein the transceiver comprises:
- a first receiver configured to receive the first orbital angular momentum signals via the first circular array of antenna elements; and
- a second receiver configured to receive the second orbital angular momentum signals via the second circular array of antenna elements.

28. The wireless communication device of claim 22, wherein the first orbital angular momentum signals and the second orbital angular momentum signals comprise coaxially propagating, spatially overlapping waves.

29. A method for wireless communication at a wireless communication device, the method comprising:
- receiving, via a first circular array of antenna elements arranged according to a first circle of a first size defining a center point, first orbital angular momentum signals based on a first reference angle;
- receiving, via a second circular array of antenna elements arranged according to a second circle of a second size smaller than the first size that is adjacent to the first circle and substantially concentric with the first circle relative to the center point, second orbital angular momentum signals based on a first offset to the first reference angle; and
- receiving, via a third circular array of antenna elements arranged according to a third circle of a third size smaller than the second size, third orbital angular momentum signals based on the first reference angle,
- a reference wavelength being associated with a reference frequency of the first orbital angular momentum signals or the second orbital angular momentum signals, a first minimum distance between a first antenna element of the first circular array of antenna elements and any antenna element of the second circular array of antenna elements that is closest to the first antenna element being at least half the reference wavelength, and a second minimum distance between a second antenna element of the second circular array of antenna elements and any antenna element of the third circular array of antenna elements that is closest to the second antenna element being at least half the reference wavelength.

* * * * *